(12) United States Patent
Morishita

(10) Patent No.: US 7,357,041 B2
(45) Date of Patent: Apr. 15, 2008

(54) ROTATION DETECTION DEVICE

(75) Inventor: Mimpei Morishita, Fuchu (JP)

(73) Assignee: Toshiba Elevator Kabushiki Kaisha, Tokyo (JP)

( * ) Notice: Subject to any disclaimer, the term of this patent is extended or adjusted under 35 U.S.C. 154(b) by 28 days.

(21) Appl. No.: 10/587,035

(22) PCT Filed: Jan. 24, 2005

(86) PCT No.: PCT/JP2005/000873

§ 371 (c)(1),
(2), (4) Date: Sep. 14, 2006

(87) PCT Pub. No.: WO2005/071423

PCT Pub. Date: Aug. 4, 2005

(65) Prior Publication Data

US 2007/0186691 A1    Aug. 16, 2007

(30) Foreign Application Priority Data

Jan. 23, 2004   (JP) .............................. 2004-016072

(51) Int. Cl.
*G01L 3/02*   (2006.01)
(52) U.S. Cl. ................................. 73/862.326
(58) Field of Classification Search ........... 73/862.325, 73/862.326
See application file for complete search history.

(56) References Cited

U.S. PATENT DOCUMENTS

| 4,020,685 A | * | 5/1977 | Van Millingen et al. ..................... 73/862.328 |
| 4,399,397 A | * | 8/1983 | Kleinschmidt, Jr. ............ 322/8 |
| 4,899,596 A | * | 2/1990 | Janik et al. ............ 73/862.329 |
| 7,054,783 B2 | * | 5/2006 | Morishita ................... 702/147 |

FOREIGN PATENT DOCUMENTS

| JP | 7-129251 A | 5/1995 |
| JP | 9-113528 A | 5/1997 |
| JP | 10-281809 A | 10/1998 |
| JP | 11-299277 A | 10/1999 |
| JP | 2002-199501 A | 7/2002 |
| JP | 2003-083769 A | 3/2003 |

\* cited by examiner

*Primary Examiner*—Max Noori
(74) *Attorney, Agent, or Firm*—Foley & Lardner LLP

(57) ABSTRACT

Torque ripple of a motor due to a rotation detection device is reduced. A periodicity gain multiplier 51 multiplies the rotation angle θ of a detection target by a ripple periodic number m per rotation of the detection target. An adder 53 adds a phase adjusting value "ψ" from a phase adjustor 49 to the value "mθ". The value "sin(mθ+ψ)", which is calculated by a sine calculator 55, is multiplied by a predetermined gain G by an amplitude adjustor 57 and by the angular velocity ω of the detection target by a multiplier 59. A subtractor 61 subtracts the output of the multiplier 59 from the value "ω" and outputs "ω(1−G sin(mθ+ψ))". The output of the subtractor 61 and the output "mθ+ψ" of the adder 53 are input to the phase adjustor 49 and amplitude adjustor 57. The phase adjustor 49 calculates the phase adjusting value "ψ" based on the summation of the derivative values of the outputs from the subtractor 61 sampled for each "π/2" of the output from the adder 53. The amplitude adjustor 57 calculates the gain G based on the summation of the differences between averages of the sampled values at "0" and "π" of the output of the adder 53 and averages of the time integration value at the integral interval of "0" to "π".

18 Claims, 12 Drawing Sheets

ROTATION DETECTION DEVICE

TECHNICAL FIELD

The present invention relates to a rotation detection device that detects rotary motion of a rotary machine and is incorporated in a control system for controlling the operation of the rotary machine based on the detection results of the rotation detection device. More particularly, the present invention relates to a technology for reducing the torque ripple of the rotary machine by reducing a ripple component contained in an output signal of the rotation detection device.

BACKGROUND ART

In general, a motor has a torque ripple. The torque ripple may cause velocity fluctuation or positioning error of a servomotor. Therefore, it may decrease machining accuracy of an NC machine, or vibrate a cage of an elevator to disturb the comfort of passengers, for example. The torque ripple may be caused by a motor itself (containaing a transmission), or by a rotation detection sensor (i.e., rotation detection device) of the motor. The torque ripple caused by the former is attributable to insufficient machining accuracy of a stator or a rotor of the motor, eccentricity of a rotor bearing, harmonic components of a magnetic field in the motor, or insufficient assembling accuracy of the transmission. Various studies have been conducted to work out a method for reducing the torque ripple caused by the former.

JP7-129251A discloses a method that: focuses on the torque ripple generated by a speed reducer; calculates a correction signal ($T_{comp}$=A sin(θ+α1)) where A is a torque ripple adjustment gain, θ is the rotation angle of a transmission, and α1 is an initial phase; adds the correction signal to a target torque reference in a feed-forward manner while synchronizing the correction signal with a motor rotation cycle, thereby to cancel the torque ripple.

JP11-299277A discloses a method that: focuses the fact that there is a correlation between the torque ripple and a motor rotation angle; causes a storage device to store the correlation; reads out torque ripple data corresponding to the motor rotation angle; and subtracts the ripple component from a torque command value to determine a new torque reference value.

Meanwhile, since the torque ripple caused by a rotation detection sensor appears as a motor torque ripple, the aforementioned control of a motor control device can solve the torque ripple problem in most cases. However, if an output value of the rotation detection sensor contains a ripple component associated with the rotation angle of the rotation detection target, the amplitude of the ripple increases in proportion to the angular velocity of the rotation detection target. Consequently, the angular velocity feedback gain for controlling the torque or the rotational velocity of the motor cannot be increased. This results not only in a heavy load on the control device but also in a higher device cost.

In order to solve the above problem, a method disclosed in JP 2003-83769A may be used. This method employs a ripple cancellation means that generates a canceling signal having a phase and an amplitude determined such that the canceling signal may cancel a ripple component caused by the rotation detection sensor.

As described above, with a conventional rotation detection device, various kinds of control procedures are applied to driving device or control device of a rotary machine, so that the rotary machine equipped with the rotation detection device does not exhibit a torque ripple or velocity fluctuation of a non-negligible level even if the output of the rotation detection device contains a ripple. Therefore, the drive device and the control device of the rotary machine become complicated, thereby reducing reliability and increasing the cost. The torque ripple of an electric motor may be caused not only by a ripple contained in the output of the rotation detection device, but also by various other factors such as assembling accuracy of a speed reducer, the machining accuracy of a motor itself, and harmonic components of a magnetic field. The ripple contained in the output of the rotation detection device makes it difficult to observe the torque ripple caused by the aforementioned other factors, and thus it can be said that the rotation detection device does not fully exercise its sensor function.

Further, when the ripple component of the rotation detection device is to be cancelled, it is necessary to adjust the amplitude and the phase of the output of the ripple cancellation means such that the ripple component is properly cancelled.

DISCLOSURE OF THE INVENTION

The present invention has been made in view of the above circumstances, and thus the object of the present invention is to provide a rotation detection device that is capable of decreasing the output ripple of the rotation detection device, reducing a torque ripple and velocity fluctuation of an actuator such as rotary machine incorporating the rotation detection device, thereby to simplify a drive device or a control device of the actuator, and to reduce the cost thereof, and to enhance the reliability thereof.

To accomplish the above objective, a rotation detection device according to the present invention is characterized by including: a rotation detecting means that detects rotary motion of a rotating body; a rotation angle converter that outputs an rotation angle of the rotating body based on an output of the rotation detecting means; an angular velocity converter that outputs an angular velocity of the rotating body based on the output of the rotation detecting means; a rotation calculating means including: a rotation angle linear function calculator that calculates a linear function concerning an output of the rotation angle converter and has a phase adjustor for setting an adjustable constant term of the linear function; a trigonometric function calculator that calculates a sine or a cosine of an output value of the rotation angle linear function calculator; an amplitude adjustor that multiplies an output value of the trigonometric function calculator by a predetermined gain; and a multiplier that multiplies an output of the amplitude adjustor by the output of the angular velocity converter; and an automatic phase adjusting means including: a phase shifting means that differentiates or integrates, with respect to time, an output of the angular velocity converter; a shifted phase sampling means that samples an output value of the phase shifting means at predetermined intervals associated with the output value of the rotation angle linear function calculator; a periodic phase deviation integrating means that adds an output of the shifted phase sampling means to a summation of outputs, having been obtained in one cycle before a predetermined point of time, of the shifted phase sampling means at the predetermined intervals associated with the output value of the rotation angle linear function calculator; and a phase gain multiplying means that multiplies a calculation result of the periodic phase deviation integrating means by a predetermined gain, wherein the periodic phase deviation integrating means is configured to output an output of the phase gain multiplying means as a phase adjusting value for the phase adjustor.

The amplitude adjustor may include an automatic amplitude adjusting means which includes: a vibration sampling means that samples the output value of the angular velocity converter at predetermined intervals associated with the output value of the rotation angle linear function calculator; a vibration sample value average calculating means that outputs, at predetermined intervals associated with the output value of the rotation angle linear function calculator, an average of the output values of the vibration sampling means obtained at a present time and obtained at a time one cycle earlier from the present time; a vibration integrating means that integrates the output of the angular velocity converter with respect to time to output an integration result; a vibration time average calculating means that calculates, at predetermined intervals associated with the output value of the rotation angle linear function calculator, a time average of the output values of the vibration integrating means; an amplitude deviation comparator that calculates, at predetermined intervals associated with the output value of the rotation angle linear function calculator, a difference between outputs of the vibration sample value average calculating means and the vibration time average calculating means; a periodic amplitude deviation integrating means that adds, at predetermined intervals associated with the output value of the rotation angle linear function calculator, an output value of the amplitude deviation comparator to a summation of outputs, having been obtained in one cycle before a predetermined point of time, of the amplitude deviation comparator; and an amplitude gain multiplying means that multiplies a calculation result of the periodic amplitude deviation integrating means by a predetermined gain; wherein the automatic amplitude adjusting means is configured to output an output value of the amplitude gain multiplying means as an amplitude adjusting gain for the amplitude adjustor.

The periodic phase deviation integrating means may comprise an integrator that integrates the output value generated by the shifted phase sampling means with respect to time.

The periodic amplitude deviation integrating means may comprise an integrator that integrates the output value generated by the amplitude deviation comparator with respect to time.

The rotation detecting means may include a resolver.

The rotation detecting means may include an encoder.

The rotation detecting means may include a power generator.

The rotation detection device may employ the rotation detecting means and the rotation calculating means which are separated from each other.

The rotation detection device may employ the rotation detecting means including the rotation calculating means.

The output of the rotation calculating means may be an angular velocity output containing a reduced ripple component of the angular velocity.

The output of the rotation calculating means may be an angular velocity output $\omega_{out}$ calculated by using Expression 1, where "$\theta$" is the rotation angle, "$\omega$" is the angular velocity, "$G$" is the amplitude adjusting gain of the amplitude adjustor, "$\psi$" is the phase adjusting value of the phase adjustor, and "$n$" is a ripple periodic number contained in the rotation angle converter output per rotation of the rotating body.

$$\omega_{out} = \omega(1 - G \sin(n\theta + \psi)) \quad \text{(Expression 1)}$$

The output of the rotation calculating means may be a rotation angle output containing a reduced ripple component of the rotation angle.

The rotation angle converter may include an integrator that integrates the output of the angular velocity converter.

The rotation calculating means may include an integrator that integrates the angular velocity output $\omega_{out}$.

The rotation detection device may include plural number of the rotation calculating means.

The output of the rotation calculating means may be a rotation angle output containing a reduced ripple component of the rotation angle or an angular velocity output containing a reduced ripple component of the angular velocity.

The automatic phase adjusting means may include a phase adjusting value storing means that stores the output value of the automatic phase adjusting means in accordance with an external signal, and that updates or reads out the stored value.

The automatic amplitude adjusting means may include an amplitude adjusting value storing means that stores the output value of the automatic amplitude adjusting means in accordance with an external signal, and that updates or reads out the stored value.

The present invention effectively eliminates a ripple component contained in the output of the rotation detecting means, and more particularly a ripple component that appears in connection with the rotation cycle of a measurement target. The present invention provides a compensation parameter automatic adjustment function that cancels the ripple component in order to reduce the ripple component contained in the output of the rotation detecting means easily and effectively even during the operation of the system without making preliminary tuning.

When a rotation angle of a rotation detection target is $\theta_0$, the rotation angle converter converts the output of the rotation detecting means containing a ripple having an amplitude of "$a$" (the symbol "$a$" is italicized in mathematical expressions in this specification) to a rotation angle output $\theta$, which is expressed by following Expression 2:

$$\theta = \theta_0 - a\cos(m\theta_0 + \phi) \quad \text{(Expression 2)}$$

where "$m$" is a ripple periodic number per rotation of the detection target, and "$\phi$" is an initial phase difference caused by mounting of the rotation detecting means to the rotation detection target.

In the present invention, for instance, the angular velocity converter differentiates "$\theta$" with respect to time to obtain an angular velocity output $\omega$, which is expressed by the following Expression below ("$\theta$" with a dot denotes the time differentiation of "$\theta$", and may be represented in this specification by "$\theta$ dot" due to the limitation of the patent application format.):

$$\omega = \dot{\theta}_0(1 + am\sin(m\theta_0 + \phi)) \quad \text{(Expression 3)}$$

If the rotation calculating means calculates its output "$\omega_{out}$" in accordance with Expression 1, Expressions 2 and 3 may be substituted into Expression 1 to express "$\omega_{out}$" as follows:

$$\omega_{out} = \dot{\theta}_0 \begin{pmatrix} 1 - G\sin(\psi - an\cos(n\theta_0 + \phi) + n\theta_0) + \\ an\sin(n\theta_0 + \phi) - anG\sin \\ (\psi - an\cos(n\theta_0 + \phi) + n\theta_0)\sin(n\theta_0 + \phi) \end{pmatrix} \quad \text{(Expression 4)}$$

In Expression 4, the ripple amplitude is generally small, and thus it can be considered that "a"<<1. Thus, Expression 4 may be expanded while the trigonometric functions are subjected to linear approximation near an angle of zero to obtain the following expression:

$$\omega_{out} = \dot{\theta}_0 \begin{pmatrix} 1 - G\sin(\psi + n\theta_0) + anG\cos(\psi + n\theta_0) \\ \cos(n\theta_0 + \phi) + an\sin(n\theta_0 + \phi) - anG\sin \\ (\psi - an\cos(n\theta_0 + \phi) + n\theta_0)\sin(n\theta_0 + \phi) \end{pmatrix} \quad \text{(Expression 5)}$$

Assuming that "aG=0", the following Expression may be obtained:

$$\omega_{out} = \dot{\theta}_0(1 - G\sin(m\theta_0 + \psi) + am\sin(m\theta_0 + \phi)) \quad \text{(Expression 6)}$$

Expression 6 indicates that the output "$\omega_{out}$" of the rotation calculating means is equal to the angular velocity "$\theta_0$ dot" of the detection target if the amplitude adjusting gain "G" is set to be equal to the ripple content "am" and if the phase adjusting value "$\psi$" is set to be equal to the initial phase difference "$\phi$". It means that the ripple contained in the output of the rotation angle detection means can be eliminated.

The angular velocity ripple component "$\omega_r$" per unit angular velocity contained in the rotation detection device may be given by the following Expression 7:

$$\omega_r = am\sin(m\theta_0 + \phi) \quad \text{(Expression 7)}$$

Therefore, when a compensation angular velocity ripple "$\omega_c$" per unit angular velocity that may be given by the following Expression 8 is added to the angular velocity ripple "$\omega_r$", $$\omega_c = -G\sin(m\theta + \psi) \quad \text{(Expression 8)}$$

the synthesized angular velocity ripple "$\omega_m$" per unit angular velocity obtained after compensation may be expressed by the following Expression 9:

$$\omega_m = \sqrt{(ma)^2 + G^2 - 2maGB\cos(\phi - \psi)} \sin(m\theta + \Omega) \quad \text{(Expression 9)}$$

where $$\tan\Omega = \frac{n\theta\sin\phi + G\sin\Psi}{n\theta\cos\phi + G\cos\Psi} \quad \text{(Expression 10)}$$

If "$\phi = \Psi$" in Expression 9, $\omega_m$ is expressed by the following Expression 11:

$$\omega_m = (ma - G)\sin(m\theta + \Psi) \quad \text{(Expression 11)}$$

In other words, if "$\phi = \psi$", the compensation angular velocity ripple "$\omega_c$" and synthesized angular velocity ripple "$\omega_m$" have the same phase, as shown in FIG. 5(a). Thus, as an algorithm for changing the phase "$\psi$" of "$\omega_c$", the phase "$\psi$" may be defined by the following Expression 12:

$$\Psi(n+1) = \alpha \sum_{k=1}^{n} e_1(k) \quad \text{(Expression 12)}$$

where: $e_1(n)$ is the deviation, from zero, of a time differential or a time integral of "$\omega_m$" which is sampled when the angle "$m\theta + \psi$", which is the angle of "$\omega_c$", is "$2n\pi + \pi/2$"; "$\alpha$" is an appropriate gain; and "n" is a non-negative integer.

Then, when "$\omega_c$" and "$\omega_m$" have the same phase, the increase/decrease in $\Psi$ is zero.

Further, the phase "$\psi$" may be defined by the following Expression 13:

$$\Psi(n+1) = \alpha \sum_{k=1}^{n} e_2(k) \quad \text{(Expression 13)}$$

where $e_1(n)$ is the deviation, from zero, of a time differential or a time integral of "$\omega_m$" which is sampled when the angle "$m\theta + \psi$", which is the angle of "$\omega_c$", is "$2n\pi + 3\pi/2$"; "$\alpha$" is an appropriate gain.

Thus, "$\psi$" may be defined, in connection with the change in the angle "$m\theta + \psi$" from 0 to $2\pi$, by the following Expression 14:

$$\Psi(n+1) = \alpha \left( \sum_{k=1}^{n} e_1(k) - \sum_{k=1}^{n} e_2(k) \right) \quad \text{(Expression 14)}$$

When the "$\omega_c$" angle "$m\theta + \psi$" changes from "$2n\pi$" to "$2n\pi + \pi$" in a situation where "$\psi$" is fixed such that "$\phi = \psi$" in Expression 14, G may be defined by the following Expression 15:

$$G(n+1) = \beta \sum_{k=1}^{n} \left( \frac{1}{T_1(k)} \int_{t(2k\pi)}^{t(2k\pi + \pi)} \omega_m dt - \omega_{mAV1}(k) \right) \quad \text{(Expression 15)}$$

where: "$t(2n\pi + 2\pi)$" and "$t(2n\pi + \pi)$" are points of time at which "$m\theta + \psi = 2n\pi$" and "$m\theta + \psi = 2n\pi + \pi$", respectively; "$\omega_{mAV1}(n)$" is the average value of "$\omega_m$" sampled at these points of time; $\beta$ is an appropriate gain; and $T_1(n) = t(2n\pi + \pi) - t(2n\pi)$.

Under such a definition, if "$\phi = \psi$", the increase/decrease in "G" is zero when the half-cycle time average value of "$\omega_m$" is equal to "$\omega_{mAv1}(n)$". When the "$\omega_c$" angle "$m\theta + \Phi$" changes from "$2n\pi + \pi$" to "$2n\pi + 2\pi$", "G" may be defined by the following Expression 16:

$$G(n+1) = \beta \sum_{k=1}^{n} \left( \frac{1}{T_2(k)} \int_{t(2k\pi + \pi)}^{t(2k\pi + 2\pi)} \omega_m dt - \omega_{mAV2}(k) \right) \quad \text{(Expression 16)}$$

where: $t(2n\pi + 2\pi)$ and $t(2n\pi + \pi)$ are points of times at which "$m\theta + \psi = 2n\pi + \pi$" and "$m\theta + \psi = 2n\pi + 2\pi$", respectively; "$\omega_{mAv2}(n)$" is the average value of "$\omega_m$" sampled at these points of time; $\beta$ is an appropriate gain; and $T_2(n) = t(2n\pi + 2\pi) - t(2n\pi + \pi)$.

Then, the time average value "$\omega_m$" is equal to "$\omega_{mAv2}(n)$" in the remaining half cycle of the rotation angle.

Thus, "G" may be defined, in connection with the change in the angle "$m\theta + \psi$" from 0 to $2\pi$, by the following Expression 17:

$$G(n+1) = \beta \left[ \sum_{k=1}^{n} \left( \frac{1}{T_1(k)} \int_{t(2k\pi)}^{t(2k\pi+\pi)} \omega_m dt - \omega_{mAV1}(k) \right) - \sum_{k=1}^{n} \left( \frac{1}{T_2(k)} \int_{t(2k\pi+\pi)}^{t(2k\pi+2\pi)} \omega_m dt - \omega_{mAV2}(k) \right) \right] \quad \text{(Expression 17)}$$

When "G" is defined as described above, "G" converges to "ma" and the amplitude of "$\omega_m$" becomes zero, as shown in FIG. 5(b).

If the ripple content "am" or the initial phase "$\phi$" are known, it goes without saying that "G" and "$\psi$" may be initially set to known values.

As described above, the ripple component contained in the output signal of the rotation detection device is cancelled by automatically adjusting the phase of the compensation angular velocity ripple in accordance with Expression 14, and by automatically adjusting the amplitude of the compensation angular velocity ripple in accordance with Expression 17.

The present invention can automatically decrease the output ripple of the rotation detection device, and thus easily reduce the torque ripple and the valocity fluctuation of an actuator such as a rotary machine in which the rotation detection device is incorporated. Further, the present invention automatically adjusts relevant parameters. Therefore, the output ripple of the rotation detecting means can be reduced easily and effectively even during the operation of the system. Furthermore, since the output ripple of the rotation detection device can be reduced by performing simple calculations, it is possible to simplify a drive device and a control device of the actuator, and thus to reduce the cost. Moreover, the present invention can reduce the ripple component without regardless of the rotation velocity of a detection target. Therefore, it is possible to enhance the accuracy and reliability of a drive system that incorporates the rotation detection device according to the present invention.

EMBODIMENTS OF THE INVENTION

Figure 1:
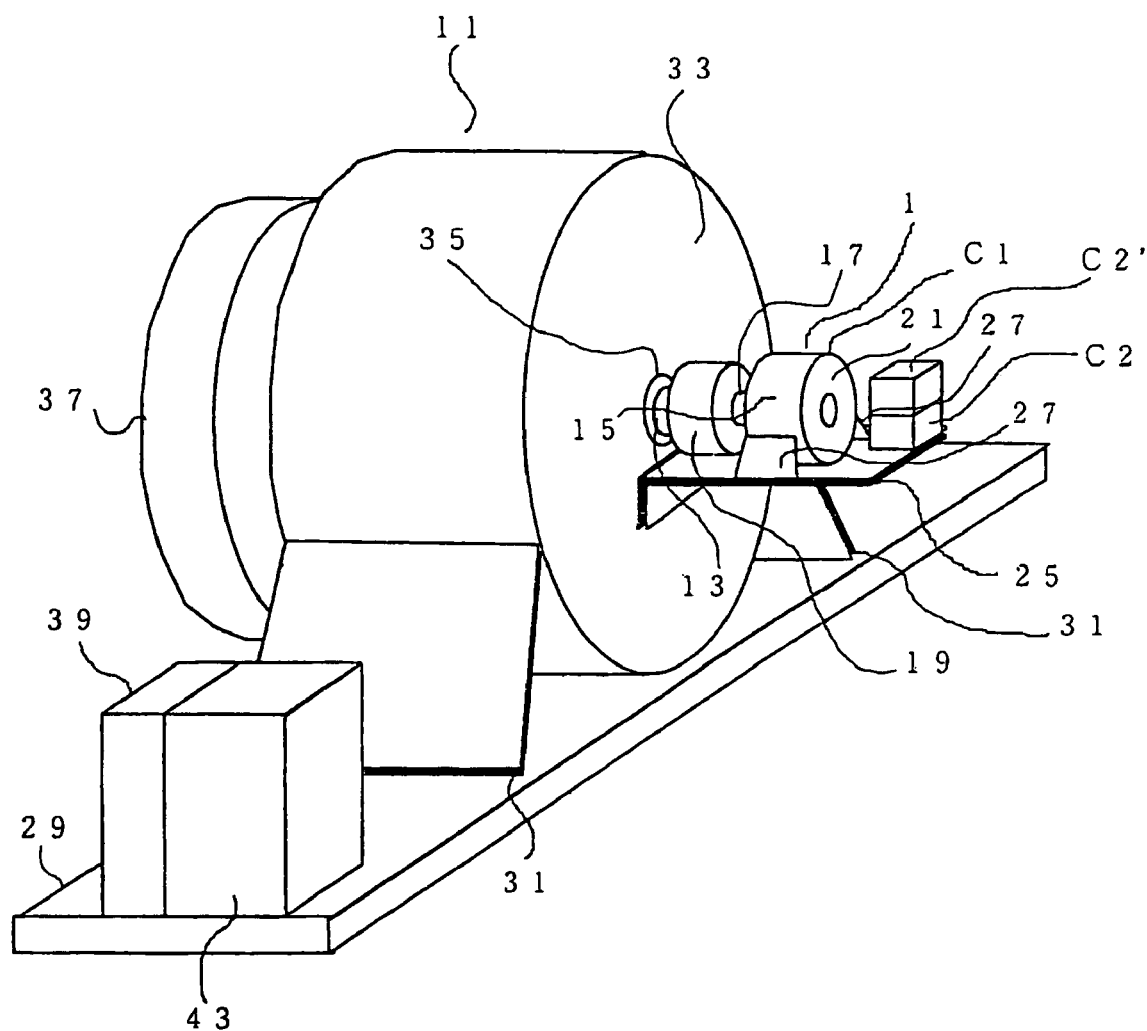
FIG. 1 is a schematic perspective view illustrating a rotation drive system equipped with a rotation detection device according to a first embodiment of the present invention.

Embodiments of the present invention will now be described in detail with reference to the accompanying drawings.

In FIGS. 1 to 4, the reference numeral 1 denotes a rotation detection device according to a first embodiment of the present invention. The rotation detection device 1 includes rotation detecting means C1 and rotation calculating means C2, C2'.

The rotation detecting means C1 includes a resolver 15, an input rotary shaft 17, and rotation transmitting means 19. The resolver 15 is mounted on a rotary electric motor 11, which is a detection object, and outputs a voltage that is proportional to the rotation angle of a rotor rotary shaft 13 of the rotary electric motor 11. The input rotary shaft 17 is directly coupled to rotor (not shown) of the resolver 15. The rotation transmitting means 19 transmits the rotation of the rotor rotary shaft 13 to the input rotary shaft 17.

The rotation transmitting means 19, which is connected to one end of the rotor rotary shaft 13, includes, for instance, a universal joint and a coupler. Ideally, the input rotary shaft 17 rotates while its shaft center coincides with that of the rotor rotary shaft 13. The resolver 15 comprises a wound rotor (not shown) and a wound stator 21, and includes a signal processor 23 that outputs a voltage corresponding to the rotation angle (e.g., a voltage between 0 and 5 V) of the input rotary shaft 17 in a range of 0 to 2nπ (rad) with reference to a predefined origin of the input rotary shaft 17. The stator 21 of the resolver 15 is fixed to a bedplate 25 via a support member 27 in a predetermined manner.

The rotary electric motor 11, which is a rotary motion detection object, will now be described with reference especially to FIG. 1. The rotary electric motor 11 is integral with a base 29 because it is mounted on the base 29 and fixed to the base 29 via a stopper 31. The rotary electric motor 11 includes not only the aforementioned rotor rotary shaft 13 but also a stator housing 33, which houses a stator of the rotary electric motor 11, a bearing 35, which supports the rotor rotary shaft 13 at the bottom center of a cylinder of the stator housing 33 and allows the rotor rotary shaft 13 to rotate, a pulley 37, which is installed over the other end of the rotor rotary shaft 13 to transmit motive energy to a load of the rotary electric motor 11 in a predetermined manner (not shown), a velocity control unit 39, which calculates a torque reference value for controlling the rotational velocity of the rotor rotary shaft 13 based on the output of the rotation detection device 1, and a driving unit 43, which receives power from a three-phase ac power supply 41 and causes the rotor rotary shaft 13 to generate a torque equivalent to the torque reference value based on the output of the velocity control unit 39.

Figure 2:
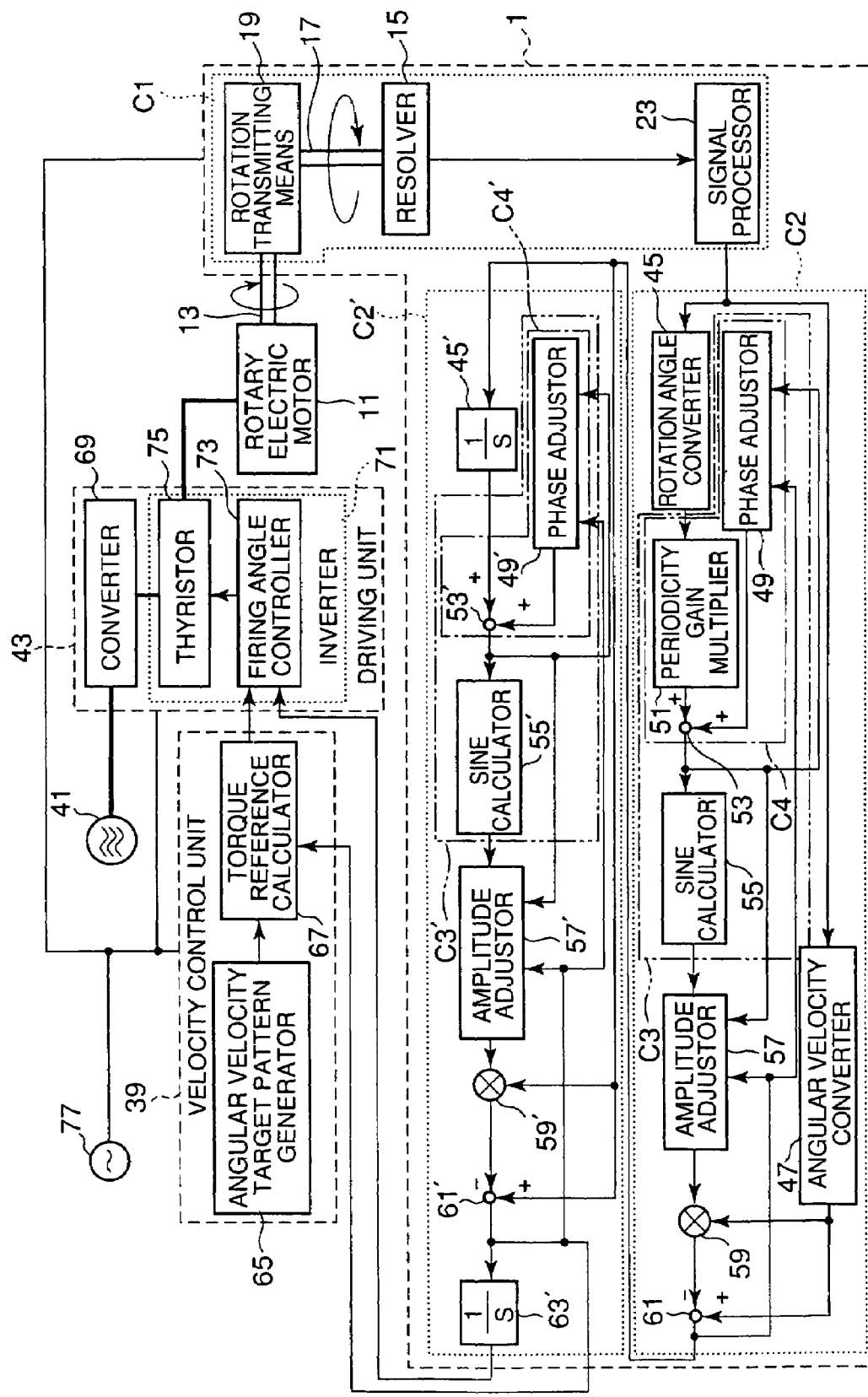
FIG. 2 is a block diagram illustrating the configuration of the rotation drive system shown in FIG. 1.

Referring to FIG. 2, the output of the rotation detecting means C1 is input to the rotation calculating means C2. The output signal of rotation detecting means C1 contains a first ripple component and a second ripple component. The first ripple component varies in a rotation cycle of the rotor rotary shaft 13 that results, for instance, from mounting eccentricity of the rotation transmitting means 19. The second ripple component varies in a cycle that is an integer multiple (e.g., four times (ripple periodic number m=4)) of the rotation cycle of the rotor rotary shaft 13, which is resulted from electromagnetic factors such as uneven winding (not shown) of the resolver 15. The rotation calculating means C2, C2' are provided to reduce the ripple components and obtain a signal equivalent to a detected rotation angle. The rotation calculating means C2 performs calculation processes to eliminate the second ripple component. The rotation calculating means C2' removes the first ripple component from a signal from which the second ripple component is already removed by the rotation calculating means C2.

The rotation calculating means C2 includes a rotation angle converter 45, which converts the output of the signal processor 23 to the rotation angle of the rotor rotary shaft 13; an angular velocity converter 47, which converts the output of the rotation angle converter 45 to the angular velocity of the rotor rotary shaft 13; a phase adjustor 49, which adjusts a phase angle relative to the output of the rotation angle converter 45; a periodicity gain multiplier 51, which multiplies its input by the ripple periodic number (e.g., 4) that is contained in the output of the rotation angle converter 45 during a rotation of the rotor rotary shaft 13, and should be eliminated; an adder 53, which adds the output of the phase adjustor 49 to the output of the periodicity gain multiplier 51; a sine calculator 55, which receives the output of the adder 53 and calculates the sine value of the received value; an amplitude adjustor 57, which multiplies the output of the sine calculator 55 by an adjustable gain; a multiplier 59, which multiplies the output of the amplitude adjustor 57 by the output of the angular velocity calculator 47; and a subtractor 61, which subtracts the output of the multiplier 59 from the output of the angular velocity calculator 47. The phase adjustor 49, periodicity gain multiplier 51, adder 53 and sine calculator 55 constitute a trigonometric function calculator C3. The periodicity gain multiplier 51, phase adjustor 49, and adder 53 constitute a rotation angle linear function calculator C4, which calculates the linear function of a rotation angle.

The rotation calculating means C2' includes a rotation angle converter 45', which serves as an integrator that integrates angular velocity, that is, the output of the rotation calculating means C2 from which the second ripple component is removed; a phase adjustor 49', which adjusts the phase angle to be added to the output of the rotation angle converter 45'; an adder 53', which adds the output of the phase adjustor 49' to the output of the rotation angle converter 45'; a sine calculator 55', which calculates the sine value of the output of the adder 53'; an amplitude adjustor 57', which multiplies the output of the sine calculator 55' by an adjustable gain; a multiplier 59', which multiplies the output of the amplitude adjustor 57' by the output of the rotation calculating means C2; a subtractor 61', which subtracts the output of the multiplier 59' from the output of the rotation calculating means C2; and an integrator 63', which integrates angular velocity, which is the output of the subtractor 61'. In the rotation calculating means C2', a trigonometric function calculator C3' is composed of the sine calculator 55' and a rotation angle linear function calculator C4' composed of the phase adjustor 49' and adder 53'.

The velocity control unit 39 and driving unit 43 will now be described to facilitate understanding. The velocity control unit 39 includes an angular velocity target pattern generator 65, which outputs an angular velocity target pattern that the angular velocity of the rotor rotary shaft 13 should follow; and a torque reference calculator 67, which calculates a torque reference value, for causing the rotational velocity of the rotor rotary shaft 13 to follow the target pattern, based on the output of the angular velocity target pattern generator 65 and the angular velocity output of the subtractor 61' for rotation calculating means C2'. The driving unit 43 includes a converter 69, which converts the power received from the three-phase ac power supply 41 to dc power; and an inverter 71, which uses the dc power fed from the converter 69 to supply three-phase ac power so that the rotary electric motor 11 generates torque equivalent to the torque reference value in accordance with the output of the torque reference calculator 67 and the output of the integrator 63'. The inverter 71 includes a firing angle controller 73, which controls the firing angle of the thyristor in accordance with the output of the torque reference calculator 67 and the output of the integrator 63' to ensure that the rotary electric motor 11 is excited by a three-phase ac current, which generates predefined torque; and a thyristor 75, which supplies the three-phase ac current to the rotary electric motor 11 in accordance with the output of the firing angle controller 73.

The power required for operating the rotation detection device 1, velocity control unit 39, and driving unit 43 is supplied from a single-phase ac power supply 77. In the block diagram, arrow lines represent signal paths, whereas bold lines represent power supply paths around the rotary electric motor 11 and rotation detection device 1.

Figure 3:
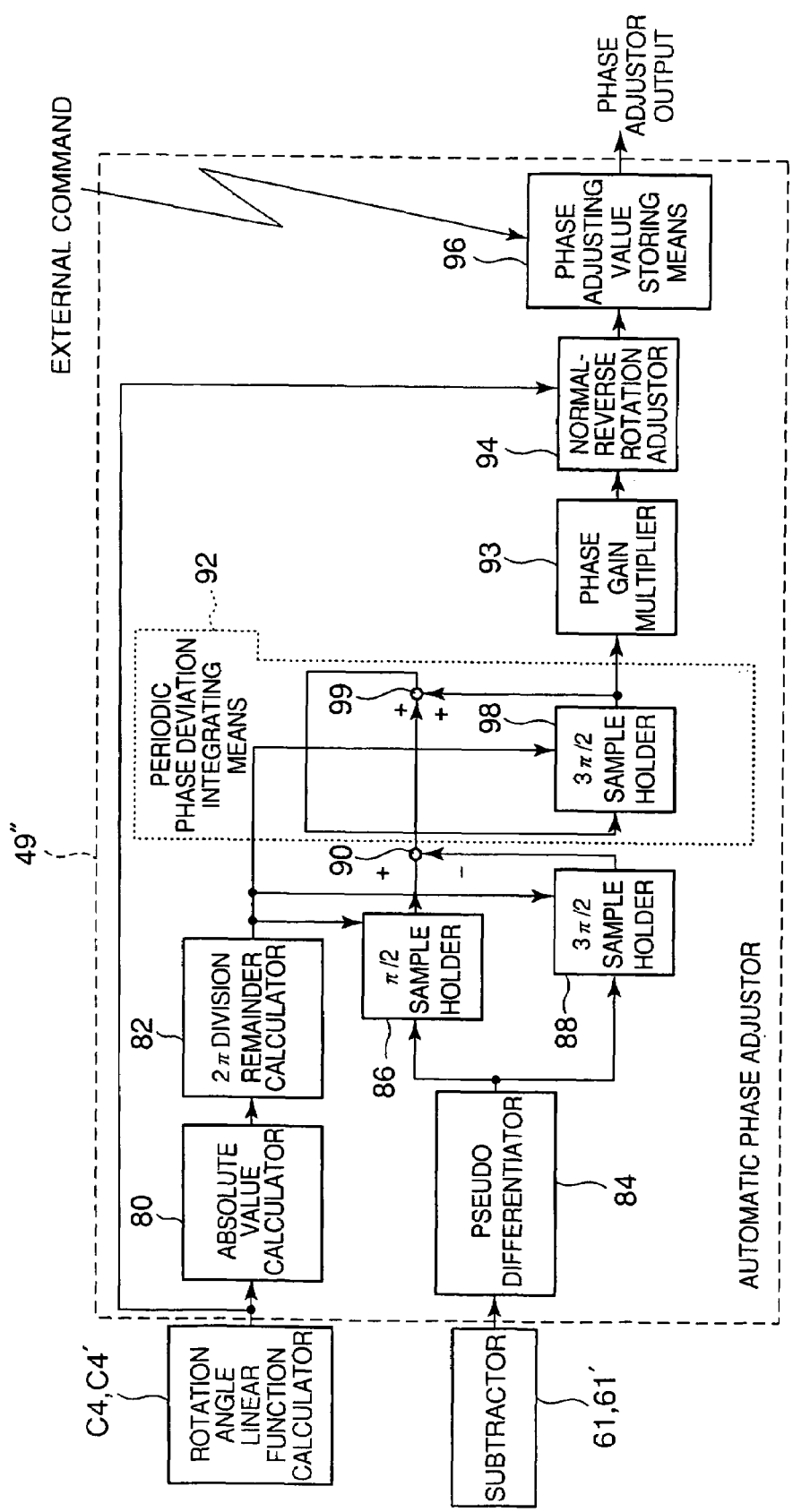
FIG. 3 is a block diagram illustrating the configuration of a phase adjustor shown in FIG. 2.

In FIG. 3, the phase adjustor 49 (49') is indicated as automatic phase adjusting means 49". The automatic phase adjusting means 49" includes an absolute value calculator 80, a $2\pi$ division remainder calculator 82, a pseudo differentiator 84, a $\pi/2$ sample holder 86, a first $3\pi/2$ sample holder 88, a subtractor 90, periodic phase deviation integrating means 92, a phase gain multiplier 93, a normal-reverse rotation adjustor 94, and phase adjusting value storing means 96. The absolute value calculator 80 receives the output of the rotation angle linear function calculator C4 (C4') and calculates the absolute value of the received rotation angle linear function. The $2\pi$ division remainder calculator 82 outputs a remainder that is obtained when the output of the absolute value calculator 80 is divided by $2\pi$. The pseudo differentiator 84 serves as vibration phase shifting means that differentiates the output signal of the subtractor 61 (61') in a predetermined low-frequency region and advances the phase thereof by 90 degrees. The $\pi/2$ sample holder 86 serves as shifted phase sampling means that receives the output of the pseudo differentiator 84, samples an input signal when the output of the $2\pi$ division remainder calculator 82 is $\pi/2$, and retains the sampled value until the next sampling timing. The first $3\pi/2$ sample holder 88 serves as shifted phase sampling means that receives the output of the pseudo differentiator 84, samples an input signal when the output of the $2\pi$ division remainder calculator 52 is $3\pi/2$, and retains the sampled value until the next sampling timing. The subtractor 90 subtracts the output value of the first $3\pi/2$ sample holder 88 from the output value of the $\pi/2$ sample holder 86. The periodic phase deviation integrating means 92 samples the output value of the subtractor 90 when the output of the $2\pi$ division remainder calculator 82 is $3\pi/2$, and adds the sampled value to the sum of previously sampled values. The phase gain multiplier 93 serves as phase gain multiplication means that receives the output of the periodic phase deviation integrating means 92 and multiplies it by a predetermined gain. The normal-reverse rotation adjustor 94 receives the output of the rotation angle linear function calculator C4 (C4') and multiplies the output of the phase gain multiplier 93 by a positive/negative sign of the rotation angle linear function. The phase adjusting value storing means 96 stores the output value of the normal-reverse rotation adjustor 94 in accordance with an external signal (not shown). The periodic phase deviation integrating means 92 comprises a second $3\pi/2$ sample holder 98 and an adder 99. The second $3\pi/2$ sample holder 98 samples an input signal when the output of the $2\pi$ division remainder calculator 82 is $3\pi/2$, and retains the sampled value until the next sampling timing. The adder 99 adds the output value of the subtractor 90 to the output value of the second $3\pi/2$ sample holder 98 and outputs the addition result to the second $3\pi/2$ sample holder 98. The output of the second $3\pi/2$ sample holder 98 is the output of the periodic phase deviation integrating means 92.

Figure 4:
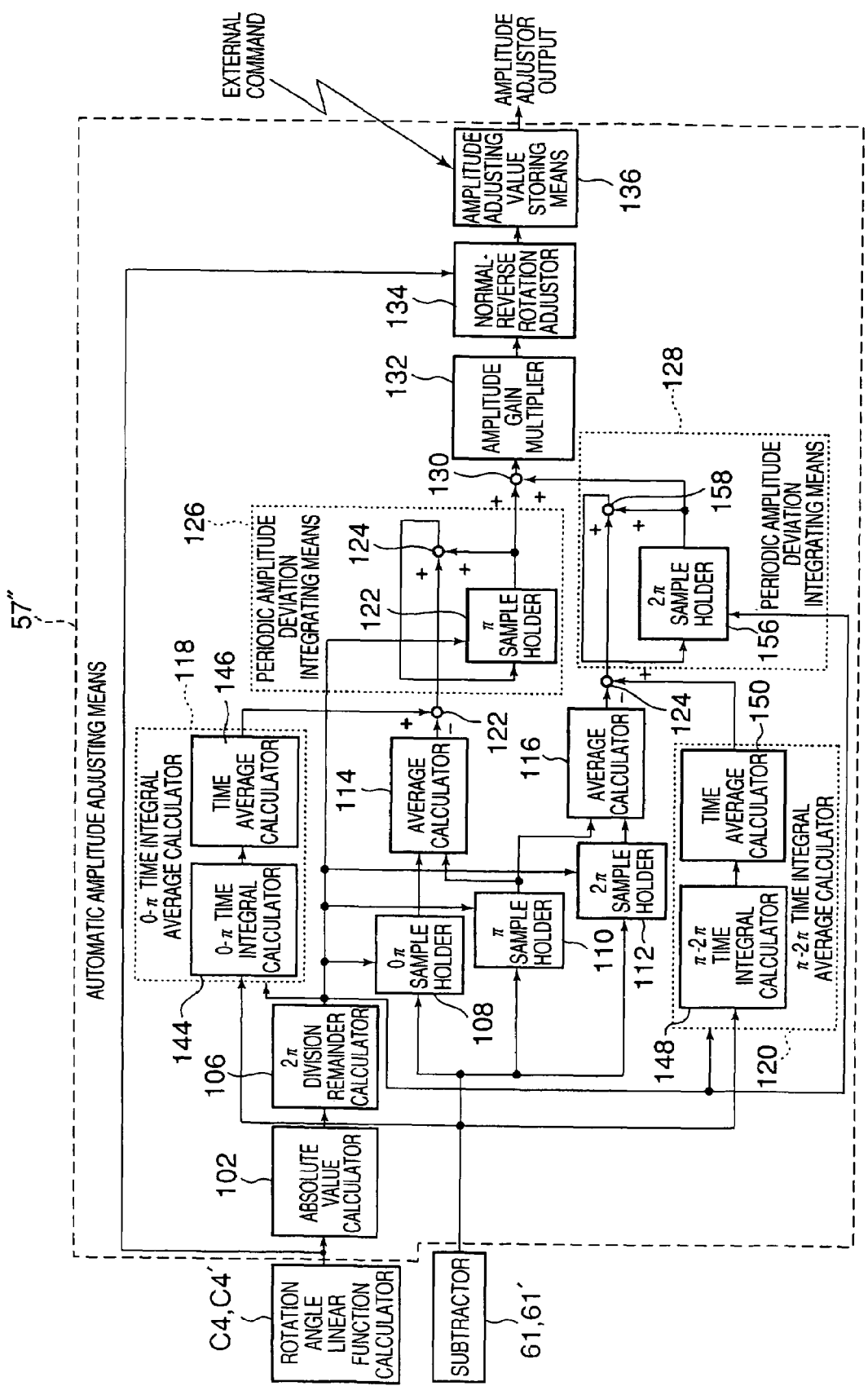
FIG. 4 is a block diagram illustrating the configuration of an amplitude adjustor shown in FIG. 2.
Figure 5:
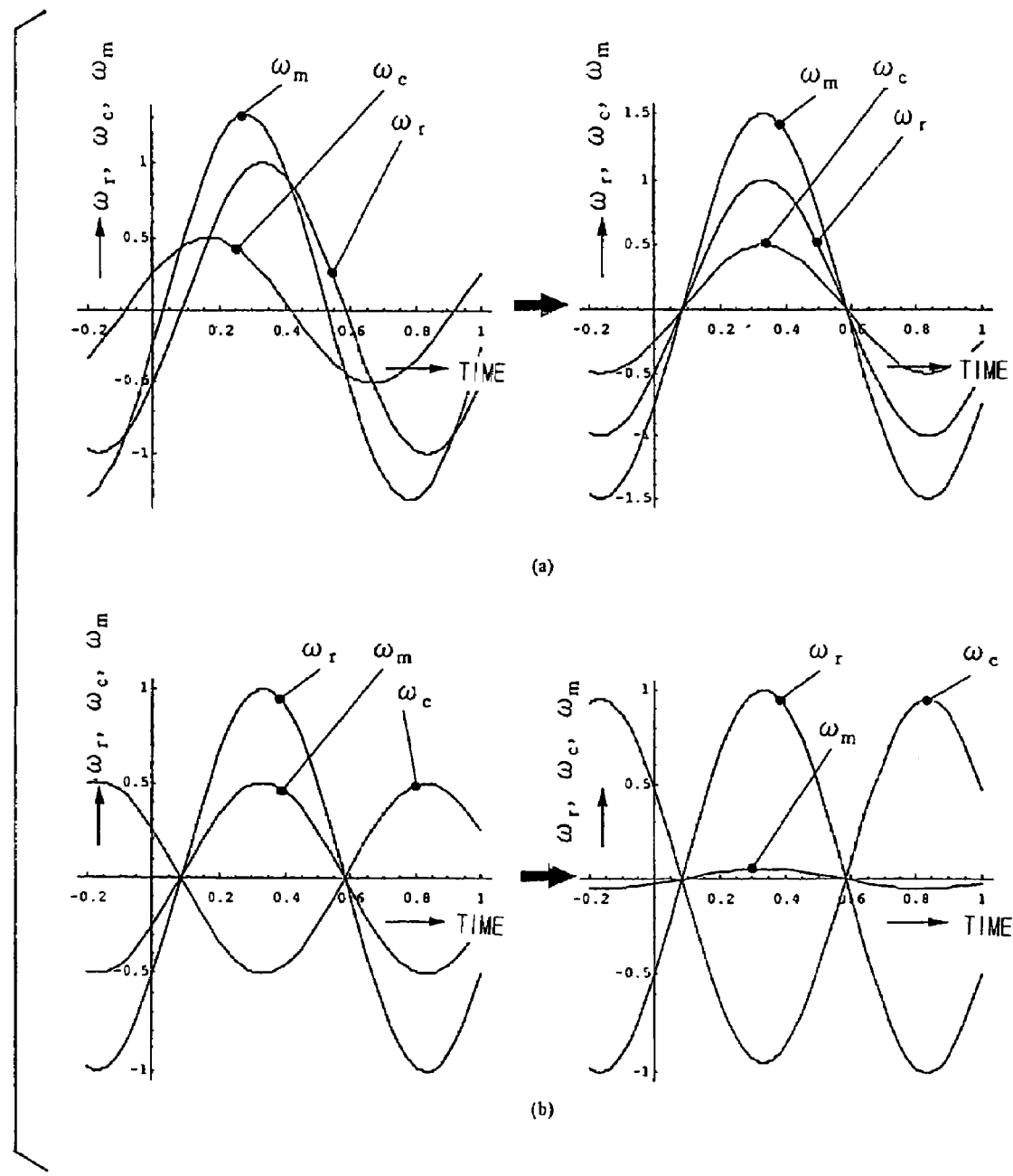
FIG. 5 includes pattern diagrams that illustrate the relationship between torque ripple and time to explain about the principles of phase and amplitude automatic adjustments.

In FIG. 4, the amplitude adjustor 57 (57') is indicated as automatic amplitude adjusting means 57". More specifically, the automatic amplitude adjusting means 57' includes a second absolute value calculator 102, a second $2\pi$ division remainder calculator 106, a $0\pi$ sample holder 108, a $\pi$ sample holder 110, a $2\pi$ sample holder 112, a first average calculator 114, a second average calculator 116, a $0-\pi$ time integral average calculator 118, a $\pi-2\pi$ time integral average calculator 120, a subtractor 122, a subtractor 124, periodic amplitude deviation integrating means 126, periodic amplitude deviation integrating means 128, a subtractor 130, an amplitude gain multiplier 132, a second normal-reverse rotation adjustor 134, and amplitude adjusting value storing means 136. The second absolute value calculator 102 receives the output of the rotation angle linear function calculator C4 (C4') and calculates the absolute value of the rotation angle linear function. The second $2\pi$ division remainder calculator 106 outputs a remainder that is obtained when the calculation result produced by the second absolute value calculator 102 is divided by $2\pi$. The $0\pi$ sample holder 108 serves as vibration sampling means that samples the output value of the subtractor 61 (61') when the output of the $2\pi$ division remainder calculator 76 is zero, and retains the sampled value until the next sampling timing. The $\pi$ sample holder 110 samples the output value of the subtractor 61 (61') when the output of the second $2\pi$ division remainder calculator 106 is $\pi$, and retains the sample value until the next sampling timing. The $2\pi$ sample holder 112 samples the output value of the subtractor 61 (61') when the output of the second $2\pi$ division remainder calculator 106 is $2\pi$, and retains the sample value until the next sampling timing. The first average calculator 114 serves as vibration sample value average calculating means that calculates the average value of the output value of the $0\pi$ sample holder 108 and the output value of the $\pi$ sample holder 110. The second average calculator 116 calculates the average value of the output value of the $\pi$ sample holder 110 and the output value of the $2\pi$ sample holder 112. The $0-\pi$ time integral average calculator 118 serves as vibration time average calculating means that performs time integration of the output of the subtractor 61 (61') while the output of the second $2\pi$ division remainder calculator 106 changes from zero to $\pi$, and calculates the time average value of the integration result. The $\pi-2\pi$ time integral average calculator 120 performs time integration of the output of the subtractor 61 (61') while the output of the second $2\pi$ division remainder calculator 106 changes from $\pi$ to $2\pi$, and calculates the time average value of the integration result. The subtractor 122 serves as an amplitude deviation comparator that subtracts the output of the first average calculator 114 from the output of the $0-\pi$ time integral average calculator 118. The subtractor 124 serves as an amplitude deviation comparator that subtracts the output of the second average calculator 116 from the output of the $\pi-2\pi$ time integral average calculator 120. The periodic amplitude deviation integrating means 126 samples the output value of the subtractor 122 when the output of the second $2\pi$ division remainder calculator 106 is $\pi$, and adds the sampled value to the sum of previously sampled values. The periodic amplitude deviation integrating means 128 samples the output value of the subtractor 124 when the output of the second $2\pi$ division remainder calculator 106 becomes $2\pi$ (immediately before being reduced to zero), and adds the sampled value to the sum of previously sampled values. The subtractor 130 subtracts the output of the periodic amplitude deviation integrating means 128 from the output of the periodic amplitude deviation integrating means 126. The amplitude gain multiplier 132 serves as vibration gain multiplication means that receives the output of the subtractor 130 and multiplies it by a predetermined gain. The second normal-reverse rotation adjustor 134 receives the output of the rotation angle linear function calculator C4 (C4') and multiplies the output of the amplitude gain multiplier 63 by a positive/negative sign of the rotation angle linear function. The amplitude adjusting value storing means 136 stores the output value of the normal-reverse rotation adjustor 134 in accordance with an external signal (not shown).

The $0-\pi$ time integral average calculator 118 shown in FIG. 4 comprises a $0-\pi$ time integral calculator 144 and a time average calculator 146. The $0-\pi$ time integral calculator 144 serves as vibration integrating means that performs time integration of the output of the subtractor 61 (61') while the output of the second $2\pi$ division remainder calculator 106 changes from zero to $\pi$. The time average calculator 146 measures the time required for the output of the second $2\pi$ division remainder calculator 106 to change from zero to $\pi$, and divides the calculation result produced by the $0-\pi$ time integral calculator 144 by the measurement result to calculate the time average of the output value of the $0-\pi$ time integral calculator 144. The output of the time average calculator 146 is the output of the $0-\pi$ time integral average calculator 118. The $\pi-2\pi$ time integral average calculator 120 comprises a $\pi-2\pi$ time integral calculator 148 and a time average calculator 150. The $\pi-2\pi$ time integral calculator 148 serves as vibration integrating means that performs time integration of the output of the subtractor 61 (61') while the output of the second $2\pi$ division remainder calculator 106 changes from $\pi$ to $2\pi$. The time average calculator 150 measures the time required for the output of the second $2\pi$ division remainder calculator 106 to change from $\pi$ to $2\pi$, and divides the calculation result produced by the $\pi-2\pi$ time integral calculator 148 by the measurement result to calculate the time average of the output value of the $\pi-2\pi$ time integral calculator 148. The output of the time average calculator 150 is the output of the $\pi-2\pi$ time integral average calculator 120.

The periodic amplitude deviation integrating means 126 comprises a second $\pi$ sample holder 152 and an adder 154.

The second π sample holder 152 samples an input signal when the output of the second 2π division remainder calculator 106 is π, and retains the sampled value until the next sampling timing. The adder 154 adds the output value of the subtractor 122 to the output value of the second π sample holder 152, and outputs the addition result to the second π sample holder 152. The output of the second π sample holder 152 is the output of the periodic amplitude deviation integrating means 126.

The periodic amplitude deviation integrating means 128 comprises a second 2π sample holder 156 and an adder 158. The second 2π sample holder 156 samples an input signal when the output of the second 2π division remainder calculator 106 becomes 2π (immediately before being reduced to zero), and retains the sampled value until the next sampling timing. The adder 158 adds the output value of the subtractor 124 to the output value of the second 2π sample holder 156, and outputs the addition result to the second 2π sample holder 156. The output of the second 2π sample holder 156 is the output of the periodic amplitude deviation integrating means 128.

Now, a description will be made of the operation performed by the rotation detection device according to the present embodiment, which is configured as described above.

The first description, which is given below, relates to a device operation that is performed when the output values of the phase adjustors 49, 49' are the predetermined values stored in the phase adjusting value storing means 96 and the output values of the amplitude adjustors 57, 57' are the predetermined values stored in the amplitude adjusting value storing means 136.

While the rotation detection device is on standby, that is, while the three-phase ac power supply 41 and single-phase ac power supply 77 are on, the rotation detection device 1, velocity control unit 39, and driving unit 43 are operating, and the angular velocity target pattern generator 65 outputs zero, the rotor rotary shaft 13 is maintained in a state where the angular velocity is zero. When the angular velocity target pattern generator 65 later generates, for instance, a trapezoidal pattern shown in FIG. 6, causing an increase in the target angular velocity, the torque reference calculator 67 calculates a torque reference value that the rotary electric motor 11 should generate in accordance with the current angular velocity of the rotor rotary shaft 13, which is output from the subtractor 61', and the angular velocity target value for the target pattern generator 65, and outputs the calculation result to the driving unit 43. The firing angle controller 75 then exercises firing angle control over the thyristor unit 73 so that the rotary electric motor 11 generates torque in accordance with the reference value. This causes the inverter 73 to output an excitation current so that the rotary electric motor 11 generates torque in accordance with the reference value. The torque generated by the rotary electric motor 11 then causes the pulley 37 to begin rotating together with the rotor rotary shaft 13. The rotation of the rotor rotary shaft 13 is input to the resolver 15 via the rotation transmitting means 19 and rotation input shaft 17. The signal processor 23 increases its output voltage in accordance with an increase in the rotation angle of the rotor rotary shaft 13. The rotation angle converter 45 converts the output voltage of the signal processor 23 to the rotation angle of the rotor rotary shaft 13. Meanwhile, in the angular velocity converter 47, the pseudo differentiator or the like converts the output voltage of the signal processor 23 to angular velocity. In this instance, the output voltage of the signal processor 23 contains the first ripple component and second ripple component for the above-mentioned reason.

The periodicity gain multiplier 51 multiplies the rotation angle (θ) obtained in the rotation angle converter 45 by 4, which is the ripple periodic number (m) per rotation of the rotor rotary shaft 13. Then, the adder 53 determines the sum (mθ+ψ) of the multiplied value and the output of the phase adjustor 49, which is the phase adjusting value (ψ). The obtained sum is then input to the sine calculator 55 to calculate the sine value of the output value of the adder 53 (sin(mθ+ψ)). The amplitude adjustor 57 multiplies the output of the sine calculator 55 by a predetermined gain (G). Then, the multiplier 59 multiplies the resulting value by an angular velocity value (ω) that is fed from the angular velocity converter 47. The output of the multiplier 59 (ωG sin(mθ+ψ)) is input to the subtractor 61 together with the angular velocity value fed from the angular velocity converter 47. The subtractor 61 subtracts the output of the multiplier 59 from the output (ω) of the angular velocity converter 47. The obtained subtraction result then becomes the output of the rotation calculating means C2 (ω−ωG sin(mθ+ψ)). In other words, the rotation calculating means C2 outputs the calculation result produced by Expression 1 as angular velocity in relation to the rotation angle and angular velocity of the rotor rotary shaft 13. Thus, the second ripple component is eliminated from the angular velocity that is output from the rotation calculating means C2.

The angular velocity output of the rotation calculating means C2 is input to the rotation calculating means C2'. More specifically, the angular velocity input to the rotation angle converter 45' provided with an integrator is integrated and converted to a rotation angle. Meanwhile, the phase adjustor 49' outputs a predetermined phase angle that corresponds to the initial phase angle of the first ripple component. The outputs of the rotation angle converter 45' and phase adjustor 49' are input to the adder 53'. The periodicity gain multiplier 51, which is positioned between the rotation angle converter 45' and adder 53', does not exist in the rotation calculating means C2 because the first ripple component is synchronized with the rotor rotary shaft. The sine calculator 55' calculates the sine value of the rotation angle to be output from the adder 53'. The amplitude adjustor 57' multiplies the output value of the sine calculator 55' by a predetermined gain that corresponds to the amplitude of the first ripple component. The multiplier 59' multiplies the output of the amplitude adjustor 57' by the angular velocity output from the rotation calculating means C2. The subtractor 61' subtracts the output of the multiplier 59' from the angular velocity output that is generated by the rotation calculating means C2. In other words, as regards the first ripple component, the subtractor 61' outputs the calculation result produced by Expression 1 as angular velocity. Therefore, all ripple components are eliminated from the angular velocity output from the subtractor 61'.

The angular velocity output from the subtractor 61' is input to the velocity control unit 39 as a first output of the rotation calculating means C2'. It is also input to the integrator 63' and converted to a rotation angle. The rotation angle output from the integrator 63' is input to the driving unit 43 as a second output of the rotation calculating means C2'. In this instance, the rotation angle and angular velocity of the rotor rotary shaft 13, which increase with an increase in the angular velocity target value, are accurately input to the torque reference calculator 67 and firing angle controller 75. Therefore, abnormal vibration due to an angular velocity increase and a torque ripple during the angular velocity is constant do not occur in the rotary electric motor 11, and the pulley 37 rotates at an angular velocity that properly follows the angular velocity target pattern shown in FIG. 6. When the target angular velocity is reduced later to zero, the angular velocity of the pulley 37 is also reduced to zero so that the rotary electric motor 11 goes on standby again.

Figure 7:
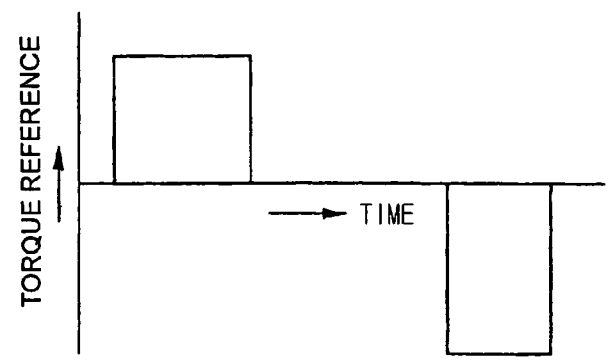
FIG. 7 is a pattern diagram illustrating the relationship between time and a torque reference value.
Figure 8:
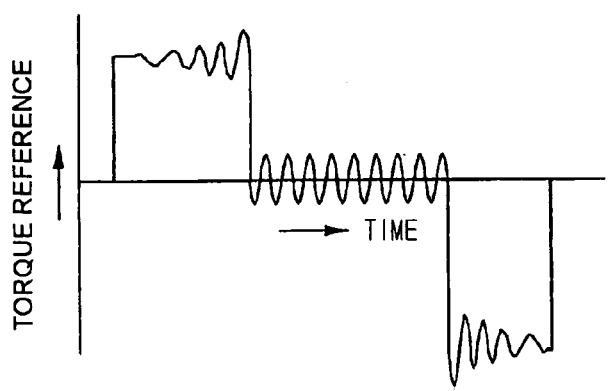
FIG. 8 is a pattern diagram illustrating the relationship between time and a conventional torque reference value.

In the above instance, the torque reference value of the torque reference calculator 67 has a waveform shown in FIG. 7. However, if the rotation detecting means C1 directly inputs the rotation information about the rotor rotary shaft 13 to the velocity control unit 39 in a conventional manner, a ripple is contained in the torque reference value as the angular velocity increases as shown in FIG. 8. The frequency and the amplitude of the ripple increase with an increase in the angular velocity of the rotor rotary shaft 13 until the angular velocity reaches its maximum value, and disappears as the angular velocity decreases. If the torque reference value contains a ripple associated with a frequency in a range of zero to a value corresponding to the operation of the maximum angular velocity as described above, the resonance of a system connected to the rotary electric motor 11 may be excited. If the angular velocity of the rotor rotary shaft 13 reaches a specific value to cause resonance of the system, the system generates noise and vibration. This may damage the system in some cases. In order to avoid such a phenomenon and enhance the system reliability, the rigidity of the entire system including the rotary electric motor 11 may be increased to raise the resonance frequency thereof. However, the use of high-rigidity materials and reinforcements are required to increase the rigidity of the system. Consequently, the cost of the entire system connected to the rotary electric motor 11 increases. In the present embodiment, however, the above problem does not occur because the torque reference value does not contain a ripple, as shown in FIG. 7.

A description will now be made of the rotation detection device operation that is performed when the rotation detection device is operated for the first time or when the phase and amplitude of the ripple component is to be newly determined in a situation where the ripple component contained in the output signal of the resolver 15 cannot be eliminated by using a value stored in the phase adjusting value storing means 96 or amplitude adjusting value storing means 136 due, for instance, to power failure. While the rotation detection device is on standby, that is, while the three-phase ac power supply 35 and single-phase ac power supply 49 are on, the rotation detection device 1 and velocity control unit 39 are operating, and the angular velocity target pattern generator 31 outputs zero, the rotary electric motor 11 is maintained in a state where the angular velocity thereof is zero. When the rotation detection device starts up, the phase adjusting value storing means 96 and amplitude adjusting value storing means 136 output the output values of the normal-reverse rotation adjustment units 94, 134, which are input to the phase adjusting value storing means 96 and amplitude adjusting value storing means 136, in accordance with an external signal (not shown) instead of outputting previously stored data. In this state, for example, the value zero is set as the integration initial values for the periodic phase deviation integrating means 92 and periodic amplitude deviation integrating means 126, 128, and the phase adjustors 49, 49' and amplitude adjustors 57, 57' output the value zero.

Figure 6:
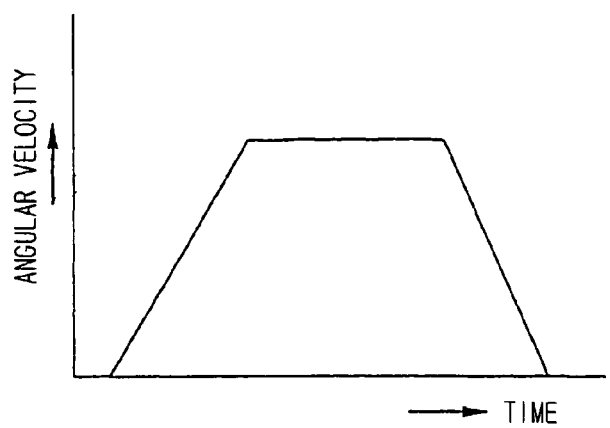
FIG. 6 is a pattern diagram illustrating the relationship between time and target angular velocity.

When the angular velocity target pattern generator 31 generates a trapezoidal pattern shown in FIG. 6, causing an increase in the target angular velocity, the rotary electric motor 11 begins to rotate. The rotation of the rotary electric motor 11 is detected by the resolver 15. However, the output voltage of the signal processor 23 contains the first and second ripple components as described earlier.

In the rotation detection device 1 according to the present invention, however, the automatic phase adjusting means 49'' and automatic amplitude adjusting means 57'' cancel the above ripple components as the rotary electric motor 11 rotates. More specifically, the output of the rotation detecting means C1 (rotation calculating means C2) is input to the rotation angle linear function calculator C4 (C4') via the rotation angle converter 45 (45'), the second (first) ripple component periodic number is multiplied by the periodicity gain multiplier 51, and the output of the phase adjustor 49 (49') is added by the adder 53 (53') to calculate a linear function concerning the rotation angle. Note that the linear function concerning the rotation angle is "$m\theta+\psi$", which is a linear function concerning $\theta$ and can be represented by the Expression "$f(\theta)=m\theta+\psi$" in which the rotation angle $\theta$ may be considered as a variable of the function and the phase adjusting value "$\psi$" may be considered as a constant term of the function (i.e., linear function constant term). The output of the rotation angle linear function calculator C4 (C4') is input to the phase adjustor 49 (49'), that is, the automatic phase adjusting means 49', and to the amplitude adjustor 57 (57'), that is, the automatic amplitude adjusting means 57''. Meanwhile, the output of the adder 61 (61') is input to the phase adjustor 49 (49') and amplitude adjustor 57 (57') as the output of the rotation calculating means C2 (C2').

In the phase adjustor 49 (49'), which is configured as the automatic phase adjusting means shown in FIG. 2, the output of the rotation angle linear function calculator C4 (C4') is input to the absolute value calculator 80 and normal-reverse rotation adjustor 94. The absolute value calculator 80 calculates the absolute value of the output ($m\theta+\psi$) of the rotation angle linear function calculator C4 (C4'), and the $2\pi$ division remainder calculator 82 calculates the remainder that is obtained when the output of the rotation angle linear function calculator C4 (C4') is divided by $2\pi$. The resulting output value is input to the $\pi/2$ sample holder 86 and $3\pi/2$ sample holders 88, 98, and used for sampling timing detection in each sampling holder.

The output of the subtractor 61 (61') is input to the pseudo differentiator 84. The output of the pseudo differentiator 84, that is, the output ripple differential (time differential of ($\omega_m$)) of the resolver 15, is input to the $\pi/2$ sample holder 86 and $3\pi/2$ sample holder 88 as a sampled signal. As described earlier, the $\pi/2$ sample holder 86 and $3\pi/2$ sample holder 88 sample the output of the pseudo differentiator 84 when the remainder obtained by dividing the absolute value of the output ($m\theta+\psi$) of the rotation angle linear function calculator C4 (C4') by $2\pi$ is $\pi/2$ or $3\pi/2$.

The outputs of the $\pi/2$ sample holder 86 and $3\pi/2$ sample holder 88 are delivered to the subtractor 90. The subtractor 90 subtracts the output value of the $3\pi/2$ sample holder 88 from the output value of the $\pi/2$ sample holder 86, and outputs the subtraction result. The output of the subtractor 90 is input to the periodic phase deviation integrating means 92. The $3\pi/2$ sample holder 98 of the periodic phase deviation integrating means 92 samples the output of the subtractor 90 whenever the remainder obtained by dividing the absolute value of the output ($m\theta+\psi$) of the rotation angle linear function calculator C4 (C4') by $2\pi$ is $3\pi/2$. Further, the $3\pi/2$ sample holder 98 uses the adder 99 to add the sampled output of the subtractor 90 to the cumulative output of the subtractor 90 (see Expression 14). The output of the periodic phase deviation integrating means 92, more specifically, the output of the 3π/2 sample holder 98, is input to the phase gain multiplier 93. The phase gain multiplier 93 multiplies the output of the 3π/2 sample holder 98 by a predetermined gain (α) that causes the output value of the automatic phase adjusting means 49″ to converge. The output of the phase gain multiplier 93 is input to the normal-reverse rotation adjustor 94. In the normal-reverse rotation adjustor 94, a predefined sign is added depending on whether the output of the rotation angle linear function calculator C4 (C4') is positive or negative. Eventually, the normal-reverse rotation adjustor 94 outputs a phase difference "ψ", which is based on Expression 14, to the phase adjusting value storing means 96. As the phase difference "ψ" comes closer to the phase difference "φ" of the angular velocity ripple indicated in Expression 7 while the rotary electric motor 11 rotates, the increase in "ψ" in Expression 14 converges to zero. Eventually, "ψ" becomes equal to "φ" so that the output value of the automatic phase adjusting means 49″ becomes stable. If the phase adjusting value storing means 96 stores the phase difference "ψ" in compliance with an external command, and outputs the stored phase difference "ψ" the next time the rotation detection device is operated, the rotation angle linear function calculator C4 (C4') outputs a phase-difference-free signal from the startup of the system. It goes without saying that at this stage the subtractor 61 (61') outputs an angular velocity signal containing the ripple component indicated in Expression 11.

When the phase difference "ψ" of the correction angular velocity ripple "$ω_c$" for eliminating the torque ripple of the rotary electric motor 11 converges, an automatic adjustment is made in the amplitude adjustor 57 (57') so that G in Expression 8 becomes equal to "am". Accordingly, in the subtractor 61 (61'), the angular velocity ripple component is canceled. In other words, the output of the rotation angle linear function calculator C4 (C4') is input to the absolute value calculator 102 and normal-reverse rotation adjustor 134. The absolute value calculator 102 calculates the absolute value of the output of the rotation angle linear function calculator C4 (C4'), and the second 2π division remainder calculator 106 calculates the remainder that is obtained when the output of the rotation angle linear function calculator C4 (C4') is divided by 2π. This output value is input to the 0π sample holder 108, π sample holders 110, 152, and 2π sample holders 112, 156, and used for sampling timing detection in each sampling holder. Further, the output of the subtractor 61 (61') is input to the 0π sample holder 108, π sample holder 110, 2π sample holder 112, 0–π time integral average calculator 118, and π–2π time integral average calculator 120. The average calculator 114 calculates the average value "$ω_{mAV1}$" of the outputs of the 0π sample holder 108 and π sample holder 110. In the 0–π time integral average calculator 118, the 0–π time integral calculator 144 and time average calculator 146 calculate the time integration average value of a rotation angle range from 0 to π (rad) of the output of the subtractor 61 (61'). The subtractor 122 uses the output of the average calculator 114 for subtraction purposes so that the value in "Σ" on the right side of Expression 15 is calculated. The π sample holder 152 and adder 154 in the periodic amplitude deviation integrating means 126 operate so that the value in "Σ" in Expression 15 is calculated as the output of the subtractor 122. As regards the outputs of the π sample holder 110 and 2π sample holder 112, the average calculator 116 calculates their average value "$ω_{mAV2}$". In the π–2π time integral average calculator 120, the π–2π time integral calculator 148 and time average calculator 150 calculate the time integration average value of a rotation angle range from π to 2π (rad) of the output of the subtractor 61 (61'). The subtractor 124 uses the output of the average calculator 116 for subtraction purposes so that the value in "Σ" on the right side of Expression 16 is calculated. The 2π sample holder 156 and adder 158 in the periodic amplitude deviation integrating means 128 operate so that the value in "Σ" in Expression 16 is calculated as the output of the subtractor 124. The outputs of the periodic amplitude deviation integrating means 126, 128 are subjected to subtraction in the subtractor 130. The amplitude gain multiplier 132 multiplies the resulting value by a predetermined gain (β) that converges the output value of the amplitude adjustor 57 (57'). Further, the normal-reverse rotation adjustor 134 multiplies the resulting value by a predetermined sign depending on whether the output of the rotation angle linear function calculator C4 (C4') is positive or negative. Eventually, the amplitude "G" based on Expression 17 is calculated. As the amplitude G comes closer to the amplitude am of the angular velocity ripple in Expression 7 while the rotary electric motor 11 rotates, the increase in "G" in Expression 17 converges to zero. Eventually, "G" becomes equal to "am" so that the angular velocity ripple "$ω_r$" is canceled.

Figure 9:
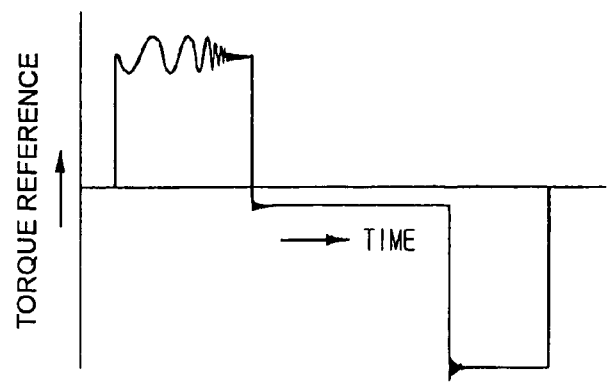
FIG. 9 is a pattern diagram illustrating the relationship between time and a torque reference value for automatic adjustment.

The torque ripple is then canceled when the rotary electric motor 11 increases its rotational velocity. As a result, the output torque of the rotary electric motor 11, which is shown in FIG. 8, is smoothed as shown in FIG. 9. If the amplitude adjusting value storing means 136 stores the amplitude "G" in compliance with an external command, and outputs the stored amplitude "G" the next time the rotation detection device is operated, the rotation calculating means C2 (C2') outputs a ripple-free angular velocity signal from the startup of the system. In this instance, the resonance of the system connected to the rotary electric motor 11 will not be excited. As a result, the operating accuracy of the system is not deteriorated and the rotation detection device is not damaged.

In the rotation detection device according to the present embodiment, a predetermined initial value (e.g., zero) is set for the phase gain multiplier 93 and amplitude gain multiplier 132 when the rotation detection device starts operating. However, these gain values are to be changed at the time of initial adjustment of the rotation detection device according to the present invention so that the output of the phase adjustor 22 and the output of the amplitude adjustor converge to a value within a predetermined range.

As regards the torque ripple that occurs in the rotary electric motor 11 and is attributable to the rotation detecting means C1, the present embodiment can cancel the angular velocity ripple contained in the output of the rotation detecting means C1 and reduce the torque ripple of the rotary electric motor 11 as described above by automatically adjusting the amplitude and phase of the compensation angular velocity ripple, which is defined by the sine function of the rotation angle of the rotary electric motor 11, by using an angular velocity signal containing a ripple component and its derivative value. It is therefore possible to reduce the vibration and noise generated in a drive target of the rotary electric motor 11 or in the main body of the rotary electric motor 11 easily and effectively while the rotation detection device is operating. This makes it possible to satisfy the functional requirements of the rotation detection device and provide a rotation detection device that is capable of enhancing reliability while reducing the cost.

Figure 10:
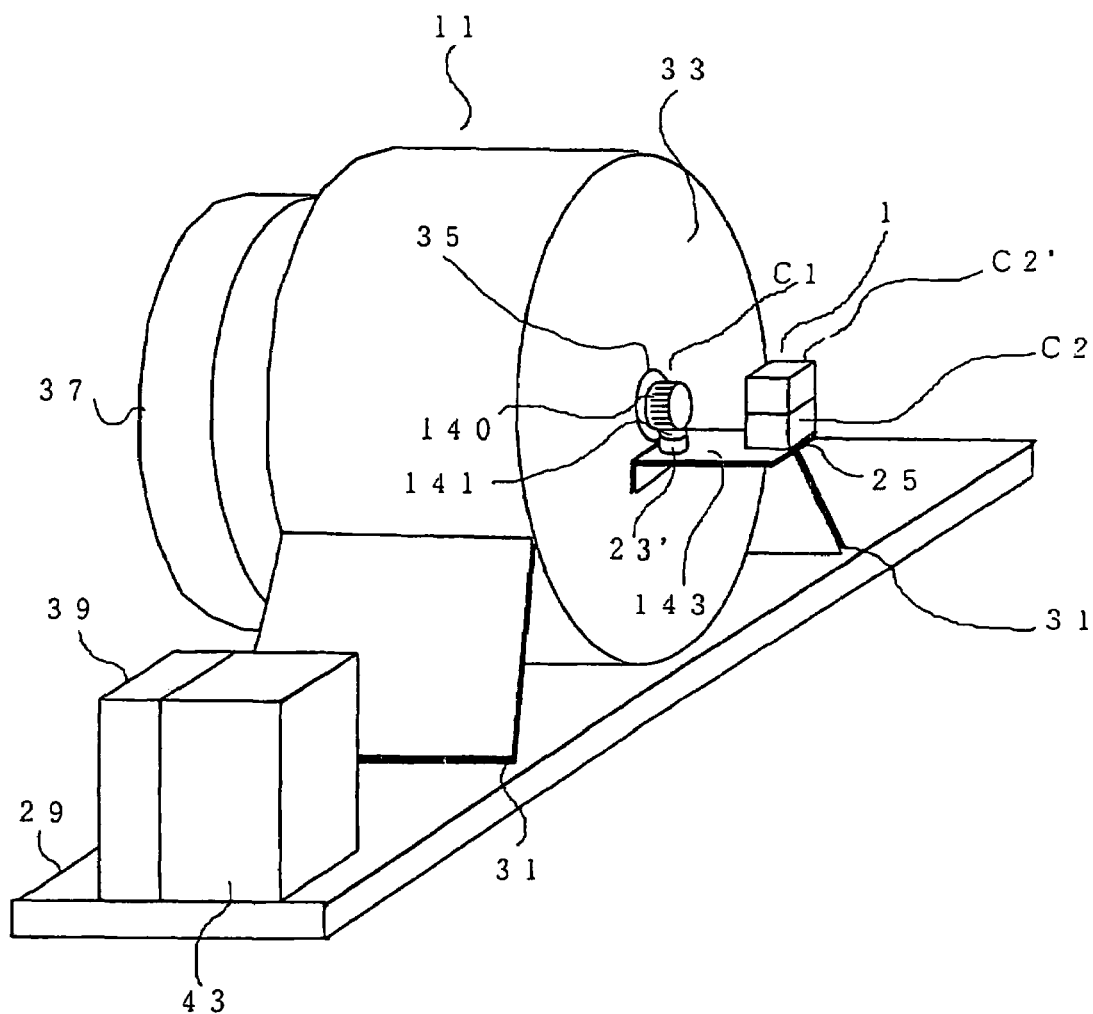
FIG. 10 is a schematic perspective view illustrating a rotation drive system that is equipped with a rotation detection device having rotation detecting means differing from the one shown in FIG. 1.
Figure 11:
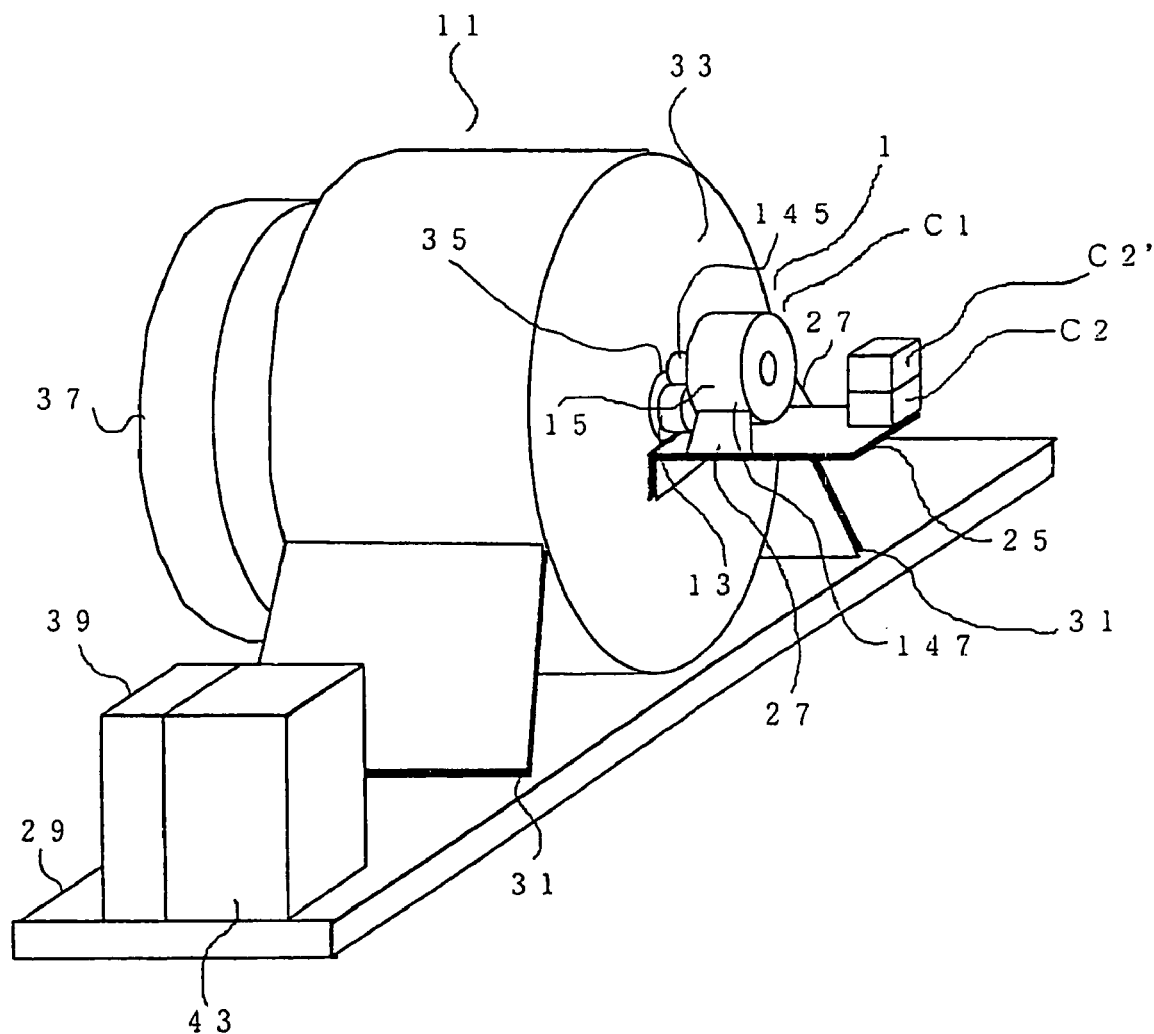
FIG. 11 is a schematic perspective view illustrating a rotation drive system that is equipped with a rotation detection device having rotation detecting means differing from the ones shown in FIGS. 1 and 10.

In the first embodiment described above, the rotation detecting means includes the resolver. However, the configuration of the rotation detecting means is not limited thereto and various modifications are possible. For example, the rotation detecting means may alternatively include a power generator that generates an output voltage in proportion to an increase in the angular velocity of its input shaft. Further, the rotation of the rotary electric motor 11 is transmitted by the rotation transmitting means 19 and rotation input shaft 17. However, the configuration of the rotation transmitting means 19 and the use of the rotation input shaft 17 are not restrictive. For example, an optical encoder 143 may alternatively be adopted as the rotation detecting means C1 that uses an optical element 141, which is assigned to the signal processor 23', to read an equally-spaced striped pattern that is positioned around an end of the rotor rotary shaft 13, as shown in FIG. 10. Another alternative is to transmit the rotation of the rotor rotary shaft 13 to a rotary encoder 147 via a roller 145 that serves as rotation transmitting means, as shown in FIG. 11.

Figure 12:
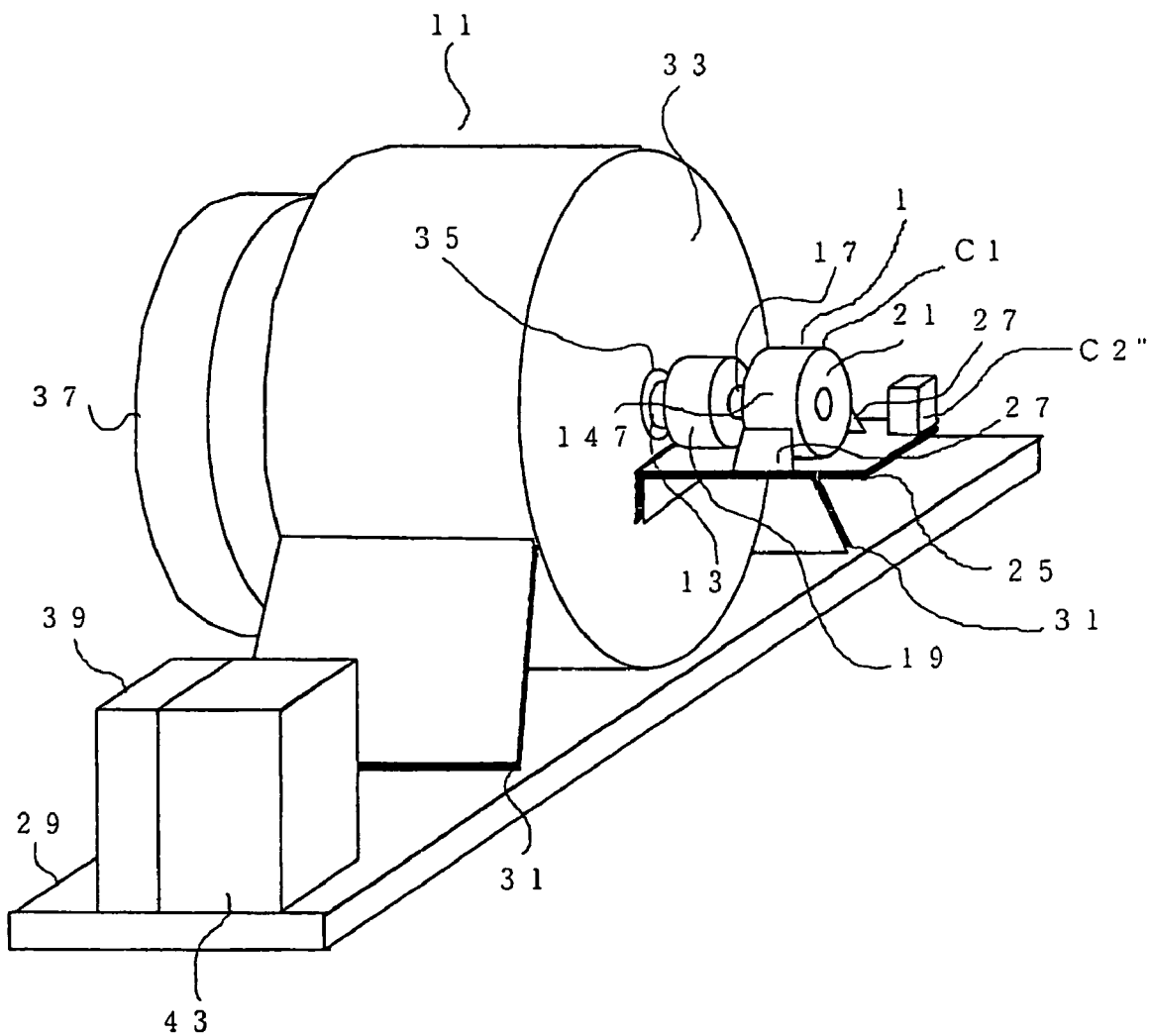
FIG. 12 is a schematic perspective view illustrating a rotation drive system that is equipped with a rotation detection device according to a second embodiment of the present invention.
Figure 13:
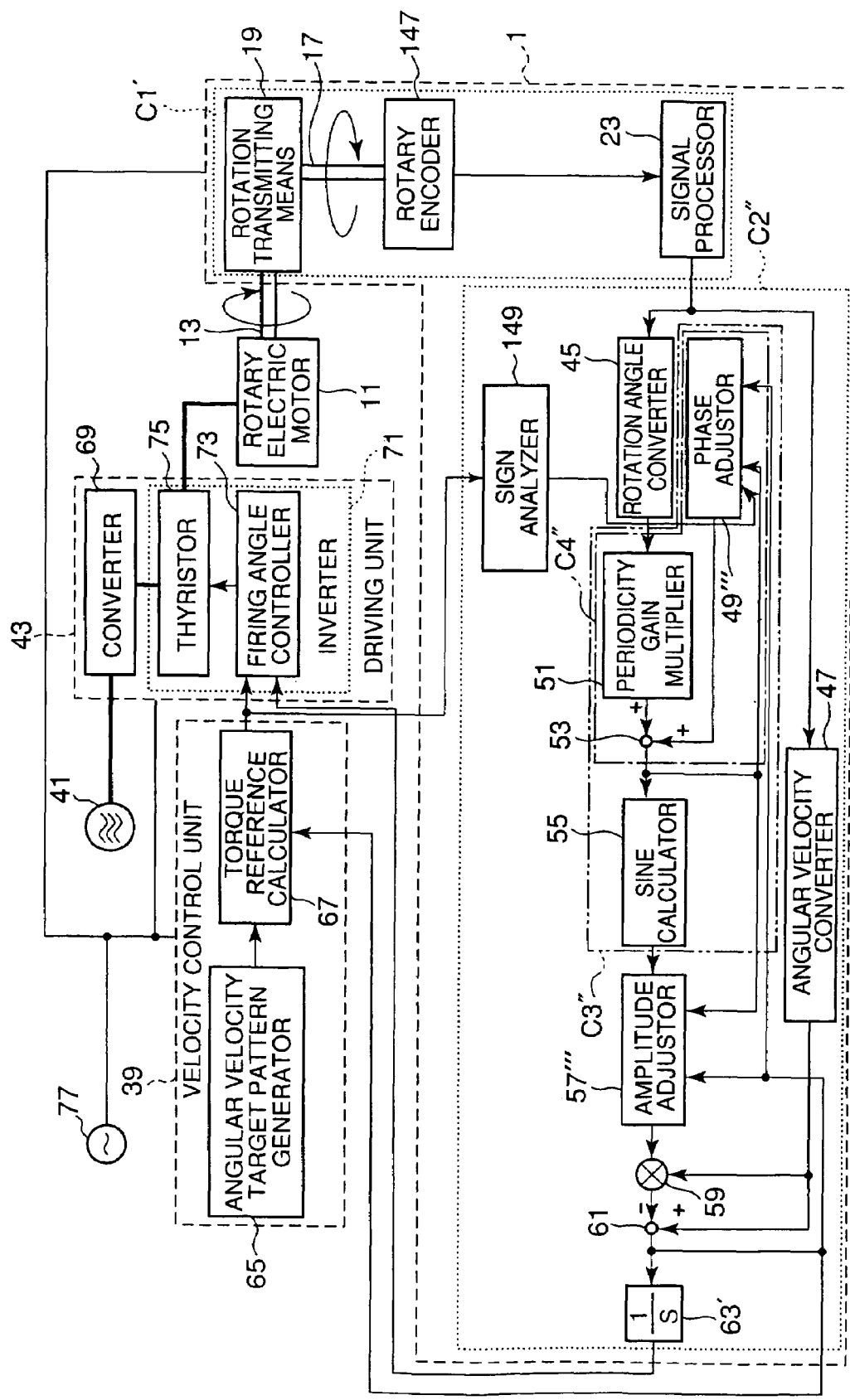
FIG. 13 is a block diagram illustrating the configuration of the rotation drive system shown in FIG. 12.

A second embodiment of the present invention will now be described with reference to FIGS. 12 and 13. In the first embodiment, the output signal of the rotation detecting means C1 is processed by the two rotation calculating means C2, C2', which are serially arranged. However, the number and configuration of rotation calculating means are not limited thereto and may be changed depending on the ripple component possessed by the output signal of the rotation detecting means. In the rotation detecting means C1' that includes the rotary encoder 147 instead of the resolver 15, the second ripple component ascribable to the resolver 15 does not exist. Meanwhile, if the rotation transmitting means 19 comprising a coupling has a play, the phase difference "φ" varies with the direction of the torque of the rotary electric motor 11. Further, if an external force is exerted on the rotor rotary shaft 13 so that the load on the rotary electric motor 11 distorts the axial center, the axial center of the rotor rotary shaft 13 may deviate from the axial center of the input rotary shaft 17, which is directly coupled to a rotary shaft (not shown) of the rotary encoder 147, depending on the magnitude of the load, thereby varying the ripple component amplitude. In such an instance, an alternative is to use rotation calculating means C2" that is capable of updating the amplitude value stored in the amplitude adjusting value storing means 136 by operating automatic amplitude adjusting means 57''' each time the magnitude of the external force changes, storing the phase adjusting values for normal rotation and reverse rotation in the phase adjusting value storing means 96 by operating automatic phase adjusting means 49''', and changing the phase adjusting value output from the phase adjusting value storing means 96 depending on whether the output of the torque reference calculator 67 is positive or negative.

More specifically, the rotation calculating means C2" includes a phase adjustor 49''', an amplitude adjustor 57''', and a sign analyzer 149 that inputs the output of the torque reference calculator 67 and judges whether the input is positive or negative. The output of the sign analyzer 149 is input to the phase adjustor 49'''. Therefore, the phase adjustor 49''' outputs a predefined appropriate value depending on whether the output of the torque reference calculator 67 is positive or negative. If, for instance, an external force that is oriented in the direction of gravity, distorts the axial center of the rotor rotary shaft 13, the amplitude adjusting gain of the amplitude adjustor 57''' converges to a value that corresponds to the external force, and if necessary, the amplitude adjusting gain is used until the external force is changed later. It goes without saying that the gain for the periodicity gain multiplier 51 in the rotation calculating means C2" is set to 1 (one). In the present embodiment, the trigonometric function calculator C3" comprises the sine calculator 55 and a rotation angle linear function calculator C4" that comprises the phase adjustor 49''', the periodicity gain multiplier 51, and the adder 53.

Figure 14:
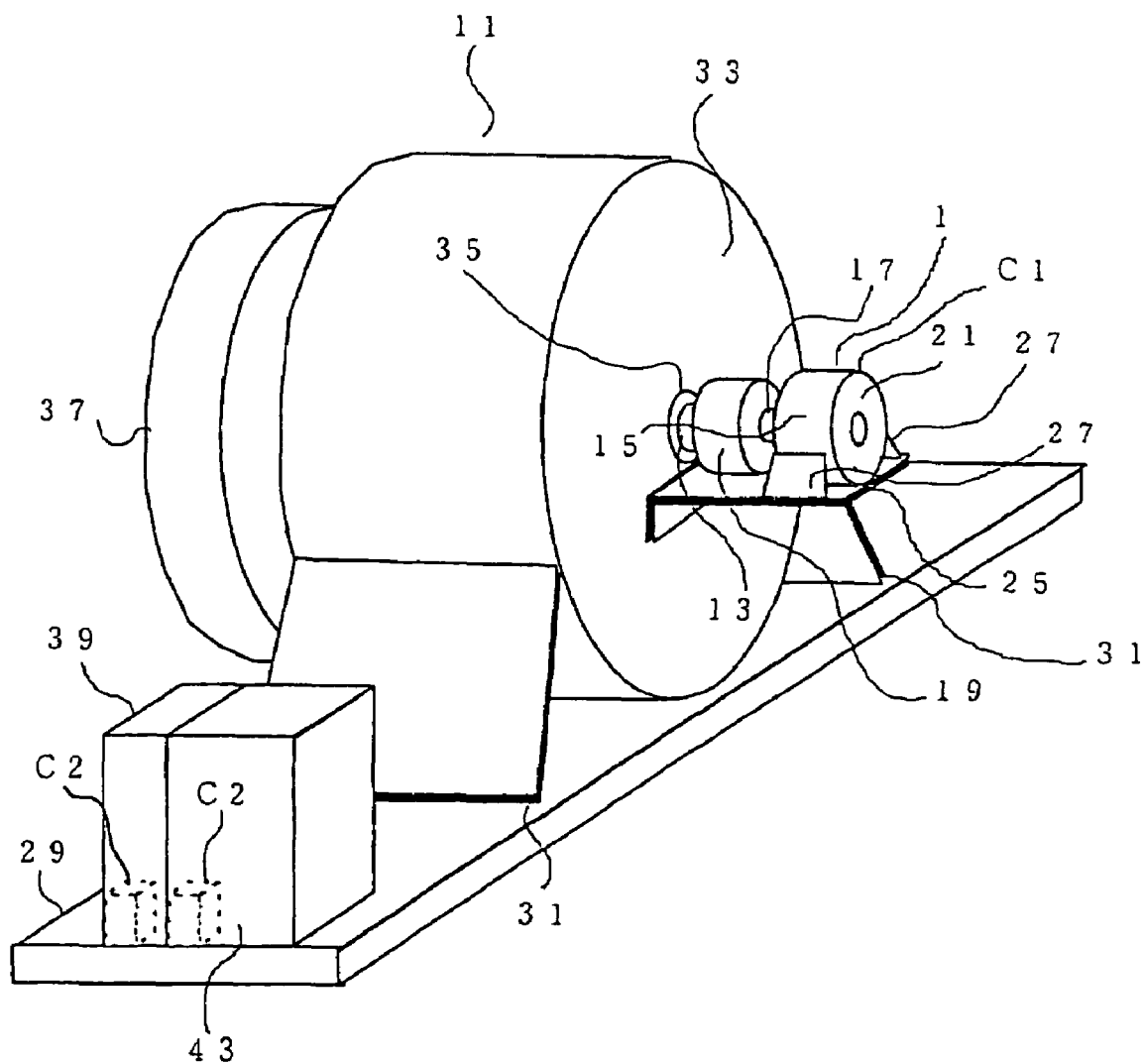
FIG. 14 is a schematic perspective view illustrating a rotation drive system that is equipped with a rotation detection device according to a third embodiment of the present invention.
Figure 15:
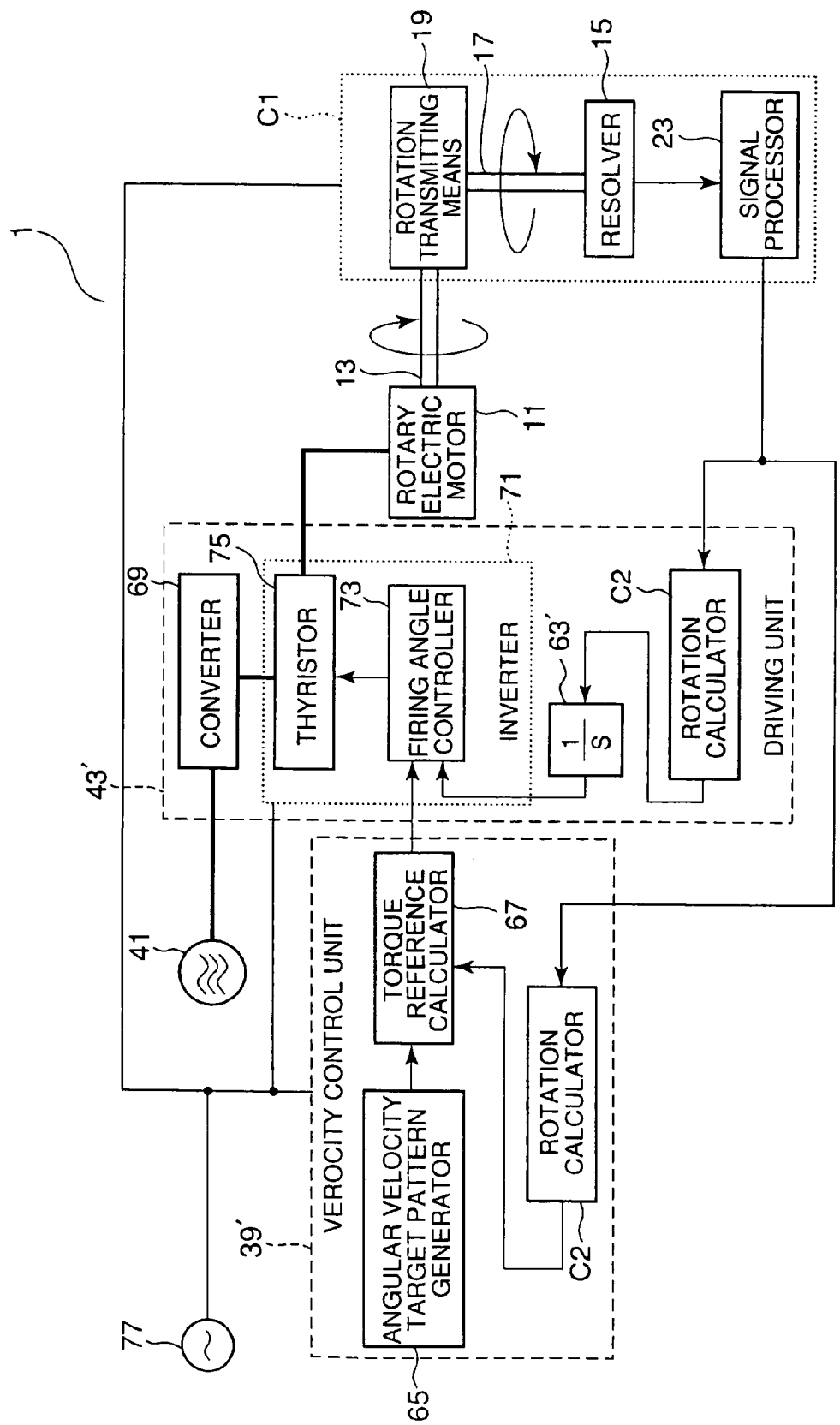
FIG. 15 is a block diagram illustrating the configuration of the rotation drive system shown in FIG. 14.

A third embodiment of the present invention will now be described with reference to FIGS. 14 and 15. In the first and second embodiments, which have been described above, the rotation detecting means and rotation calculating means are positioned adjacent to each other to constitute the rotation detection device 1. However, the distance between the rotation detecting means and rotation calculating means and their positions are not restrictive. As shown in FIGS. 14 and 15, the rotation calculating means C2 may be incorporated in a velocity control unit 39' or driving unit 43'. Since the driving unit 43' requires a rotation angle, the output of the rotation calculating means C2 is input to the firing angle controller 73 via the integrator 63'. The rotation calculating means C2' is not used because the aforementioned first ripple component ascribable to the rotation transmitting means is sufficiently small. The present embodiment makes it easy to install the rotation detection device because the rotation detecting means C1 is only to be mounted on the rotary electric motor 11.

The embodiments described above assume that the rotation calculating means performs analog calculations. However, the present invention is not limited to analog calculations. Alternatively, a digital calculation method may be employed.

The embodiments described above assume that the rotary electric motor is targeted for rotation detection. However, the detection target for the rotation detection device is not limited to the rotary electric motor. For example, an alternative detection target may be a linear motor that uses a rotary encoder to convert the distance moved by a mover to a rotation angle via a wheel.

While the present invention has been described in terms of embodiments, those skilled in the art will recognize that various modifications may be made to the embodiments without departing from the spirit and scope of the present invention.

The invention claimed is:

1. A rotation detection device comprising:
   a rotation detecting means that detects rotary motion of a rotating body;
   a rotation angle converter that outputs an rotation angle of the rotating body based on an output of the rotation detecting means;
   an angular velocity converter that outputs an angular velocity of the rotating body based on the output of the rotation detecting means;
   a rotation calculating means including: a rotation angle linear function calculator that calculates a linear function concerning an output of the rotation angle converter and has a phase adjustor for setting an adjustable constant term of the linear function; a trigonometric function calculator that calculates a sine or a cosine of an output value of the rotation angle linear function calculator; an amplitude adjustor that multiplies an output value of the trigonometric function calculator by a predetermined gain; and a multiplier that multiplies an output of the amplitude adjustor by the output of the angular velocity converter; and
   an automatic phase adjusting means including: a phase shifting means that differentiates or integrates, with respect to time, an output of the angular velocity converter; a shifted phase sampling means that samples an output value of the phase shifting means at predetermined intervals associated with the output value of the rotation angle linear function calculator; a periodic phase deviation integrating means that adds an output of the shifted phase sampling means to a summation of outputs, having been obtained in one cycle before a predetermined point of time, of the shifted phase sampling means at the predetermined intervals associated with the output value of the rotation angle linear function calculator; and a phase gain multiplying means that multiplies a calculation result of the periodic phase deviation integrating means by a predetermined gain, wherein the periodic phase deviation integrating means is configured to output an output of the phase gain multiplying means as a phase adjusting value for the phase adjustor.

2. The rotation detection device according to claim 1, wherein the amplitude adjustor includes an automatic amplitude adjusting means which includes:
a vibration sampling means that samples the output value of the angular velocity converter at predetermined intervals associated with the output value of the rotation angle linear function calculator;
a vibration sample value average calculating means that outputs, at predetermined intervals associated with the output value of the rotation angle linear function calculator, an average of the output values of the vibration sampling means obtained at a present time and obtained at a time one cycle earlier from the present time;
a vibration integrating means that integrates the output of the angular velocity converter with respect to time to output an integration result;
a vibration time average calculating means that calculates, at predetermined intervals associated with the output value of the rotation angle linear function calculator, a time average of the output values of the vibration integrating means;
an amplitude deviation comparator that calculates, at predetermined intervals associated with the output value of the rotation angle linear function calculator, a difference between outputs of the vibration sample value average calculating means and the vibration time average calculating means;
a periodic amplitude deviation integrating means that adds, at predetermined intervals associated with the output value of the rotation angle linear function calculator, an output value of the amplitude deviation comparator to a summation of outputs, having been obtained in one cycle before a predetermined point of time, of the amplitude deviation comparator; and
an amplitude gain multiplying means that multiplies a calculation result of the periodic amplitude deviation integrating means by a predetermined gain;
wherein the automatic amplitude adjusting means is configured to output an output value of the amplitude gain multiplying means as an amplitude adjusting gain for the amplitude adjustor.

3. The rotation detection device according to claim 1, wherein the periodic phase deviation integrating means comprises an integrator that integrates the output value of the shifted phase sampling means with respect to time.

4. The rotation detection device according to claim 2, wherein the periodic amplitude deviation integrating means comprises an integrator that integrates the output value of the amplitude deviation comparator.

5. The rotation detection device according to claim 1, wherein the rotation detecting means includes a resolver.

6. The rotation detection device according to claim 1, wherein the rotation detecting means includes a power generator.

7. The rotation detection device according to claim 1, wherein the rotation detecting means includes an encoder.

8. The rotation detection device according to claim 1, wherein the rotation detecting means is separated from the rotation calculating means.

9. The rotation detection device according to claim 1, wherein the rotation detecting means includes the rotation calculating means.

10. The rotation detection device according to claim 1, wherein the output of the rotation calculating means is an angular velocity output including a reduced ripple component of the angular velocity.

11. The rotation detection device according to claim 1, wherein the output of the rotation calculating means is an angular velocity output $\omega_{out}$ that is calculated from the following Expression $$\omega_{out}=\omega(1-G\sin(n\theta+\psi))$$

where $\theta$ is the rotation angle, $\omega$ is the angular velocity, G is the amplitude adjusting gain of the amplitude adjustor, $\psi$ is the phase adjusting value of the phase adjustor, and n is a ripple periodic number contained in the rotation angle converter output per rotation of the rotating body.

12. The rotation detection device according to claim 1, wherein the output of the rotation calculating means is a rotation angle output including a reduced ripple component of the rotation angle.

13. The rotation detection device according to claim 1, wherein the rotation angle converter includes an integrator that integrates the output of the angular velocity converter.

14. The rotation detection device according to claim 1, wherein the rotation calculating means includes an integrator that integrates the angular velocity output $\omega_{out}$.

15. The rotation detection device according to claim 1, wherein the output of the rotation calculating means is a rotation angle output including a reduced ripple component of the rotation angle, or an angular velocity output including a reduced ripple component of the angular velocity.

16. The rotation detection device according to claim 1, wherein said device includes a plural number of the rotation calculating means.

17. The rotation detection device according to claim 1, wherein the automatic phase adjusting means includes a phase adjusting value storing means that stores the output value of the automatic phase adjusting means in accordance with an external signal, and that updates or reads out a value stored therein.

18. The rotation detection device according to claim 1, wherein the automatic amplitude adjusting means includes an amplitude adjusting value storing means that stores the output value of the automatic amplitude adjusting means in accordance with an external signal, and that updates or reads out the stored value.

* * * * *